US012111610B2

(12) United States Patent
Kawanami et al.

(10) Patent No.: US 12,111,610 B2
(45) Date of Patent: Oct. 8, 2024

(54) IMAGE FORMING APPARATUS HAVING IMPROVED MOUNTABILITY OF A CARTRIDGE WHILE CONSERVING SPACE

(71) Applicant: CANON KABUSHIKI KAISHA, Tokyo (JP)

(72) Inventors: Takeo Kawanami, Kanagawa (JP); Kazuaki Nogami, Saitama (JP); Takehiro Hayashi, Kanagawa (JP); Kenji Watanabe, Shizuoka (JP); Shunsuke Hijikata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/481,545

(22) Filed: Oct. 5, 2023

(65) Prior Publication Data

US 2024/0027956 A1 Jan. 25, 2024

Related U.S. Application Data

(63) Continuation of application No. 17/981,740, filed on Nov. 7, 2022, now Pat. No. 11,809,127, which is a (Continued)

(30) Foreign Application Priority Data

Aug. 12, 2020 (JP) ................................ 2020-136143
Aug. 12, 2020 (JP) ................................ 2020-136209
Aug. 12, 2020 (JP) ................................ 2020-136229

(51) Int. Cl.
*G03G 21/18* (2006.01)
*G03G 21/16* (2006.01)

(52) U.S. Cl.
CPC ..... *G03G 21/1853* (2013.01); *G03G 21/1652* (2013.01); *G03G 21/1814* (2013.01); *G03G 21/1842* (2013.01); *G03G 2221/1869* (2013.01)

(58) Field of Classification Search
CPC ........... G03G 21/1609; G03G 21/1652; G03G 21/1814; G03G 21/1842; G03G 21/1853; (Continued)

(56) References Cited

U.S. PATENT DOCUMENTS 7,599,640 B2 10/2009 Sato
8,290,395 B2 10/2012 Uchida
(Continued)

FOREIGN PATENT DOCUMENTS

CN 101923297 A 12/2010
CN 104360589 A 2/2015
(Continued)

OTHER PUBLICATIONS

Combined Search and Examination Report issued in GB Appln. No. 2111391.5, mailed on Jan. 26, 2022.
(Continued)

*Primary Examiner* — Sophia S Chen
(74) *Attorney, Agent, or Firm* — ROSSI, KIMMS & McDOWELL LLP

(57) ABSTRACT

In an image forming apparatus, a tray unit to which a cartridge is detachably mounted, and that is configured to be capable of moving between an internal position situated within the apparatus main body and an external position situated outside, includes first and second side plates configured to support the cartridge, and they are each made of metal, and include a supporting portion and an outer side portion, the supporting portions includes positioning portions configured to come into contact with the cartridge to (Continued)

position the cartridge as to an image forming position. The apparatus main body includes first and second pressing members each capable of moving between pressing positions at which the cartridge is pressed, and separated positions separated from the cartridge. The first and second pressing members are disposed each intersecting with imaginary planes that is orthogonal to the longitudinal direction and intersect the positioning portions.

18 Claims, 20 Drawing Sheets

Related U.S. Application Data continuation of application No. 17/397,054, filed on Aug. 9, 2021, now Pat. No. 11,526,124.

(58) Field of Classification Search

CPC .......... G03G 21/1867; G03G 21/1878; G03G 2221/1684; G03G 2221/1869; G03G 2221/1884

See application file for complete search history.

(56) References Cited

U.S. PATENT DOCUMENTS

| | | | |
|---|---|---|---|
| 8,301,054 | B2 | 10/2012 | Tanabe |
| 9,146,492 | B2 | 9/2015 | Suzuki |
| 9,304,437 | B2 | 4/2016 | Hashimoto |
| 9,857,761 | B2 | 1/2018 | Osawa |
| 2006/0269313 | A1 | 11/2006 | Takagi |
| 2007/0160380 | A1 | 7/2007 | Imaizumi |
| 2007/0280730 | A1 | 12/2007 | Okabe |
| 2008/0159772 | A1 | 7/2008 | Koishi et al. |
| 2010/0111562 | A1 | 5/2010 | Okabe |
| 2010/0239314 | A1 | 9/2010 | Takayama |
| 2012/0070186 | A1 | 3/2012 | Kikuchi et al. |
| 2018/0052423 | A1 | 2/2018 | Hwang |
| 2018/0136603 | A1 | 5/2018 | Watanabe et al. |
| 2019/0302687 | A1 | 10/2019 | Miyoshi et al. |

FOREIGN PATENT DOCUMENTS

| | | | | |
|---|---|---|---|---|
| EP | 1939697 | A1 * | 7/2008 | ......... G03G 21/1867 |
| EP | 3699693 | A1 | 8/2020 | |
| JP | H1020660 | A | 1/1998 | |
| JP | H1074030 | A | 3/1998 | |
| JP | H10301465 | A | 11/1998 | |
| JP | 2000112200 | A | 4/2000 | |
| JP | 2002311728 | A | 10/2002 | |
| JP | 2007148287 | A | 6/2007 | |
| JP | 2007213018 | A | 8/2007 | |
| JP | 2008165023 | A | 7/2008 | |
| JP | 2008165026 | A | 7/2008 | |
| JP | 2008197588 | A | 8/2008 | |
| JP | 2010102303 | A | 5/2010 | |
| JP | 2010107888 | A | 5/2010 | |
| JP | 2010107890 | A | 5/2010 | |
| JP | 2012088686 | A | 5/2012 | |
| JP | 2012212188 | A | 11/2012 | |
| JP | 2013054050 | A | 3/2013 | |
| JP | 2014106392 | A | 6/2014 | |
| JP | 2016114620 | A | 6/2016 | |
| JP | 2016224083 | A | 12/2016 | |
| JP | 2018081194 | A | 5/2018 | |
| JP | 2019184660 | A | 10/2019 | |
| KR | 1020180019408 | A | 2/2018 | |

OTHER PUBLICATIONS

Office Action issued in U.S. Appl. No. 17/397,054, mailed May 20, 2022.

Notice of Allowance issued in U.S. Appl. No. 17/397,054, mailed Aug. 30, 2022.

Office Action issued in U.S. Appl. No. 17/981,740, mailed on Mar. 17, 2023.

Notice of Allowance issued in U.S. Appl. No. 17/981,740, mailed on Jul. 14, 2023.

Office Action issued in Chinese Appln. No. 202110916266.0 mailed on Apr. 30, 2024. English translation provided.

* cited by examiner

IMAGE FORMING APPARATUS HAVING IMPROVED MOUNTABILITY OF A CARTRIDGE WHILE CONSERVING SPACE

BACKGROUND OF THE INVENTION

Field of the Invention

The present invention relates to an image forming apparatus that forms images on recording material.

Description of the Related Art

There are image forming apparatuses, such as printers, photocopiers, multifunction peripherals, and so forth, in which a cartridge is detachably mounted to a moving member that moves between the interior and the exterior of an apparatus main body. Japanese Patent Application Publication No. 2016-114620 discloses an image forming apparatus in which a cartridge is detachably mounted to a moving member that moves between the interior and the exterior of an apparatus main body. The moving member in Japanese Patent Application Publication No. 2016-114620 is provided with a metal reinforcement member.

SUMMARY OF THE INVENTION

The present invention is a further advancement of the conventional technology. The present invention relates to an image forming apparatus including an apparatus main body, and a tray unit having a side plate formed of metal, to which a cartridge is detachably mounted, in which the tray unit is configured to be movable as to the apparatus main body. It is an object of the present invention to provide technology capable of improving mountability of the cartridge to the apparatus main body and conservation of space of the apparatus configuration.

In order to solve the above-described problem, an image forming apparatus according to the present invention, configured to perform image forming operations using a cartridge, includes:

an apparatus main body; and a tray unit to which the cartridge is detachably mounted, and that is configured to be capable of moving with respect to the apparatus main body, between an internal position situated within the apparatus main body and an external position situated outside of the apparatus main body, the tray unit including:

a first side plate configured to support the cartridge, wherein the first side plate is made of metal, and includes a first supporting portion and a first outer side portion, the first supporting portion includes a first positioning portion, and the first positioning portion is configured to come into contact with the cartridge to position the cartridge as to an image forming position at which the image forming operation is performed, a second side plate configured to support the cartridge, wherein the second side plate is made of metal, and includes a second supporting portion and a second outer side portion, the second supporting portion includes a second positioning portion, and the second positioning portion is configured to come into contact with the cartridge to position the cartridge as to the image forming position, and a mounting portion to which the cartridge is mounted in a mounting direction, wherein the mounting portion is formed between the first side plate and the second side plate, and, in a case of being viewed in the mounting direction, the first supporting portion and the second supporting portion are situated between the first outer side portion and the second outer side portion in the longitudinal direction of the cartridge mounted to the mounting portion, wherein the apparatus main body includes:

a first pressing member that is capable of moving between a first pressing position at which the cartridge is pressed, and a first separated position separated from the cartridge, and a second pressing member that is capable of moving between a second pressing position at which the cartridge is pressed, and a second separated position separated from the cartridge, wherein the first pressing member is disposed intersecting with a first imaginary plane that is orthogonal to the longitudinal direction and intersects the first positioning portion, and wherein the second pressing member is disposed intersecting with a second imaginary plane that is orthogonal to the longitudinal direction and intersects the second positioning portion.

In order to solve the above-described problem, an image forming apparatus according to the present invention, configured to perform image forming operations using a cartridge, includes:

an apparatus main body; and a tray unit to which the cartridge is detachably mounted, and that is configured to be capable of moving with respect to the apparatus main body, between an internal position situated within the apparatus main body and an external position situated outside of the apparatus main body, the tray unit including:

a first side plate configured to support the cartridge, wherein the first side plate is made of metal, and includes a first supporting portion and a first outer side portion, the first supporting portion includes a first positioning portion, and the first positioning portion is configured to come into contact with the cartridge to position the cartridge as to an image forming position at which the image forming operation is performed, a second side plate configured to support the cartridge, wherein the second side plate is made of metal, and includes a second supporting portion and a second outer side portion, the second supporting portion includes a second positioning portion, and the second positioning portion is configured to come into contact with the cartridge to position the cartridge as to the image forming position, and a mounting portion to which the cartridge is mounted in a mounting direction, wherein the mounting portion is formed between the first side plate and the second side plate, and, in a case of being viewed in the mounting direction, the first supporting portion and the second supporting portion are situated between the first outer side portion and the second outer side portion in the longitudinal direction of the cartridge mounted to the mounting portion, wherein the tray unit has a tray contact configured to be electrically connected to a cartridge contact of the cartridge, the tray contact having a contact portion that comes into contact with the cartridge contact, and wherein the contact portion is situated between the second supporting portion and the second outer side portion in the longitudinal direction.

In order to solve the above-described problem, an image forming apparatus according to the present invention, configured to perform image forming operations using a cartridge, includes:

an apparatus main body; and a tray unit to which the cartridge is detachably mounted, and that is configured to be capable of moving with respect to the apparatus main body, between an internal position situated within the apparatus main body and an external position situated outside of the apparatus main body, the tray unit including:

a first side plate configured to support the cartridge, wherein the first side plate is made of metal, and includes a first supporting portion and a first outer side portion, the first supporting portion includes a first positioning portion, and the first positioning portion is configured to come into contact with the cartridge to position the cartridge as to an image forming position at which the image forming operation is performed, a second side plate configured to support the cartridge, wherein the second side plate is made of metal, and includes a second supporting portion and a second outer side portion, the second supporting portion includes a second positioning portion, and the second positioning portion is configured to come into contact with the cartridge to position the cartridge as to the image forming position, and a mounting portion to which the cartridge is mounted in a mounting direction, wherein the mounting portion is formed between the first side plate and the second side plate, and, in a case of being viewed in the mounting direction, the first supporting portion and the second supporting portion are situated between the first outer side portion and the second outer side portion in the longitudinal direction of the cartridge mounted to the mounting portion, wherein the tray unit has a first guided groove and a second guided groove that are guided by the apparatus main body in case of moving from the external position to the internal position, and wherein, with respect to the longitudinal direction, at least part of the first guided groove is situated between the first supporting portion and the first outer side portion, and at least part of the second guided groove is situated between the second supporting portion and the second outer side portion.

According to the present invention, mountability of the cartridge to the apparatus main body and conservation of space of the apparatus configuration can be improved.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. Each of the embodiments of the present invention described below can be implemented solely or as a combination of a plurality of the embodiments or features thereof where necessary or where the combination of elements or features from individual embodiments in a single embodiment is beneficial.

First Embodiment

Overall Configuration

Figure 1:
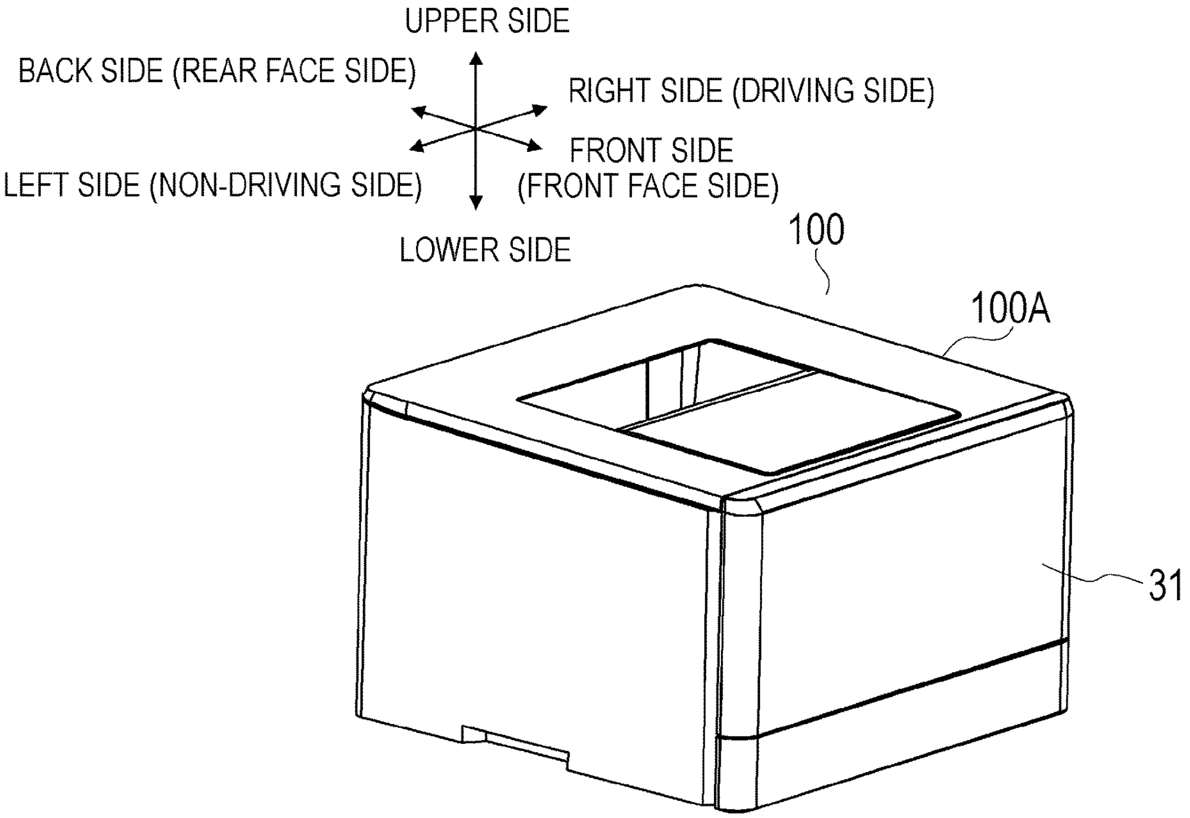
FIG. 1 is an overall perspective diagram illustrating a printer according to a first embodiment of the present disclosure.

First, a printer 100 serving as an image forming apparatus according to a first embodiment is a full-color laser beam printer according to an electrophotographic system. The printer 100 has an apparatus main body 100A and a front door 31 supported so as to be capable of opening and closing as to the apparatus main body 100A, as illustrated in FIG. 1. Note that directions are defined as follows in description of the printer 100. That is to say, the side of the printer 100 on which the front door 31 is provided is a front side (or front face side), and the opposite side therefrom is a back side (or rear face side), and the direction from the back side toward the front side and the direction from the front side toward the back side is a front-back direction.

Also, a left side (or non-driving side) and a right side (or driving side), and an upper side and a lower side are defined with a state of viewing the printer 100 from the front side as a reference. The direction from the right side toward the left side and the direction from the left side toward the right side is a right-left direction, and the direction from the lower side toward the upper side and the direction from the upper side toward the lower side is an up-down direction.

Figure 2:
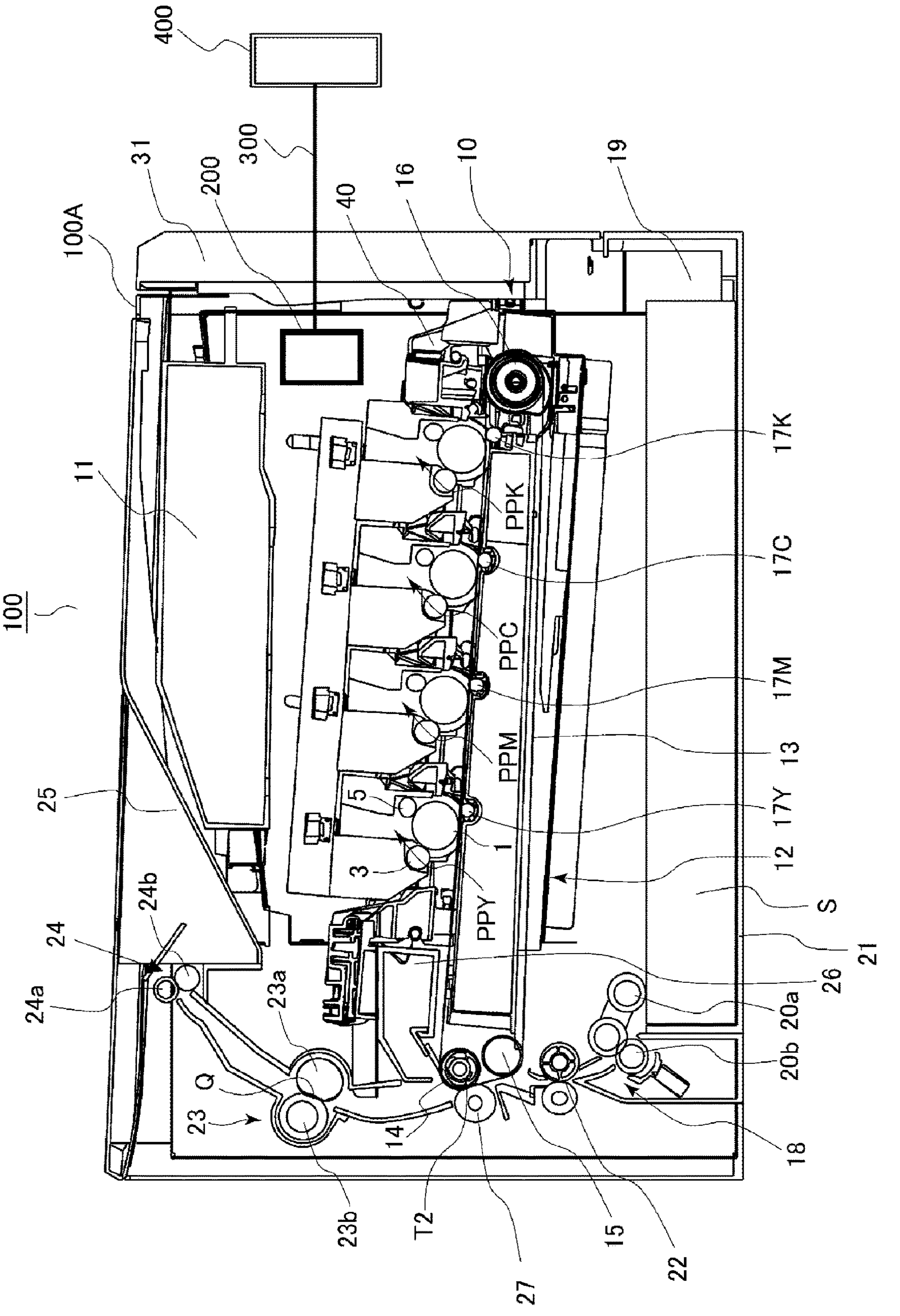
FIG. 2 is an overall schematic diagram illustrating an internal configuration of the printer.

The printer 100 has an image forming unit 10 that forms images on sheets S, a sheet feeding portion 18, a fixing device 23, a discharge roller pair 24, and a control portion 200, as illustrated in FIG. 2. The printer 100 can form full-color images or monochrome images on sheet-like recording media (hereinafter, referred to as "sheet S"), on the basis of electrical image signals input to the control portion 200, output from an external host device 400 via an interface portion 300. Examples of the external host device 400 include a personal computer, an image reader, a facsimile apparatus, and so forth.

The control portion 200 is a control unit for controlling an electrophotographic image forming process of the printer 100, and exchanges various types of electrical information with the external host device 400. The control portion 200 also governs processing of electrical information input from various types of process devices and sensor, processing of command signals to various types of process devices, predetermined initial sequence control, sequence control of predetermined image forming processes, and so forth.

The sheet feeding portion 18 is provided at a lower portion of the printer 100, and includes a cassette 19 that accommodates the sheets S, a sheet plate 21 that supports the sheets S so as to be capable of being raised and lowered, a pick-up roller 20*a*, and a separating roller pair 20*b*. The cassette 19 is configured to be capable of being drawn out and mounted from the front side of the apparatus main body 100A. The sheets S loaded on the sheet plate 21 are fed by the pick-up roller 20*a*, and separated into individual sheets by the separating roller pair 20*b*. Note that a torque limiter system or a retard roller system may be applied to the separating roller pair 20*b*, and a separating pad may be applied instead of one roller of the separating roller pair 20*b*.

The fixing device 23 has a fixing film 23*a* that is heated by a heater, and a pressure roller 23*b* that presses against the fixing film 23*a*, forming a fixing nip Q by the fixing film 23*a* and the pressure roller 23*b*. The discharge roller pair 24 has a discharge driving roller 24*a*, and a discharge driven roller 24*b* that rotates following driving of the discharge driving roller 24*a*.

The image forming unit 10 has a cartridge tray 40, four process cartridges (cartridges) PPY, PPM, PPC, and PPK, a scanner unit 11, a transfer unit 12, and a cleaning unit 26. The transfer unit 12 has a driving roller 14, an auxiliary roller 15, a tension roller 16, and an intermediate transfer belt 13. The intermediate transfer belt 13 is stretched over the driving roller 14, the auxiliary roller 15, and the tension roller 16, is configured of a dielectric material, and has flexibility. The printer 100 is configured to perform image forming operations using the process cartridges PPY, PPM, PPC, and PPK that are detachably mountable to the apparatus main body 100A.

Primary transfer rollers 17Y, 17M, 17C, and 17K that face the respective photosensitive drums of the process cartridges PPY, PPM, PPC, and PPK are provided on the inner side of the intermediate transfer belt 13. A secondary transfer roller 27 is provided on the opposite side of the driving roller 14 across the intermediate transfer belt 13. The intermediate transfer belt 13 and the secondary transfer roller 27 together form a secondary transfer nip T2.

The four process cartridges PPY, PPM, PPC, and PPK form toner images of the four colors of yellow (Y), magenta (M), cyan (C), and black (K), respectively. Note that the four process cartridges PPY, PPM, PPC, and PPK each have the same configuration, other than the color of images formed thereby (the color of toner accommodated) being different. Accordingly, the configuration and the image forming process will be described regarding one of the four process cartridges PPY, PPM, PPC, and PPK, and description of the others will be omitted. Also, if there is no need to distinguish among the process cartridges PPY, PPM, PPC, and PPK, the process cartridges PPY, PPM, PPC, and PPK may be referred to simply as "process cartridges PP".

Figure 3A:
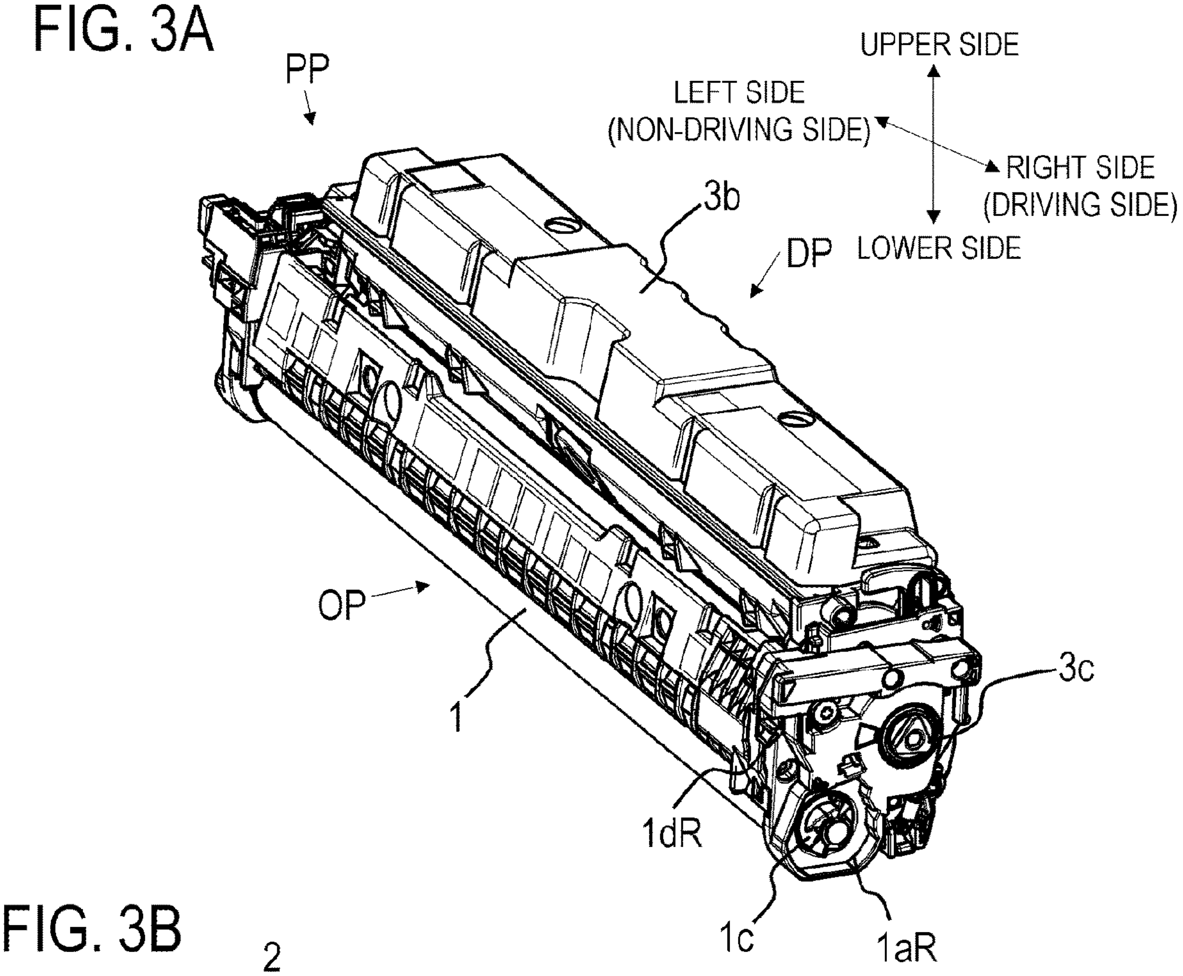
FIGS. 3A and 3B are a frontal perspective view and a rear perspective view illustrating a process cartridge.
Figure 3B:
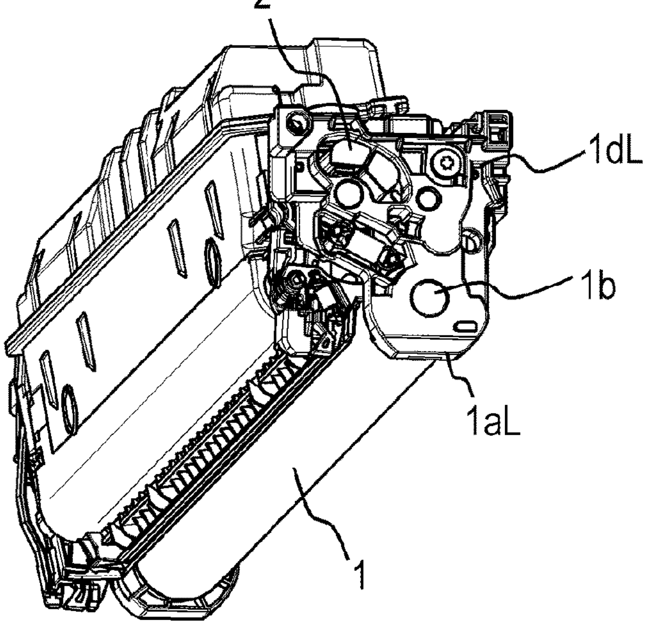

The process cartridge PPY has a drum unit OP and a developing unit DP integrated into a unit, as illustrated in FIGS. 2 through 3B. The drum unit OP has a photosensitive drum 1 serving as an image bearing member, and the developing unit DP has a developing roller 3 that develops a latent image formed on the photosensitive drum 1 as a toner image, and a storage portion 3*b* that stores a developer. A drum coupling (driving transmission member, first driving transmission member) 1*c* and a developing coupling (driving transmission member, second driving transmission member) 3*c* are each provided on the driving side (right side) in the longitudinal direction of the photosensitive drum 1 and the developing roller 3. Driving force from an unshown driving force source of the apparatus main body 100A is transmitted to the drum coupling 1*c* and the developing coupling 3*c*, and the photosensitive drum 1 and the developing roller 3 rotate.

Also, a cartridge developing contact 2 is provided on the non-driving side (left side) in the longitudinal direction of the developing roller 3. Developing bias is applied to the cartridge developing contact 2, in a state of being in contact with a later-described main body developing contact 38 (see FIG. 20B) provided to the apparatus main body 100A. A grounding member (cartridge contact, cartridge electrode) 1*b* for connecting the photosensitive drum 1 to ground potential is provided at the non-driving side in the longitudinal direction of the photosensitive drum 1.

A drum bearing (driving side support member, first end portion supporting member) 1*a*R is provided to a driving side end portion (first end portion) of the process cartridge PPY in the longitudinal direction of the process cartridge PPY, as illustrated in FIGS. 3A and 3B. A drum bearing (non-driving side support member, second end portion supporting member) 1*a*L is provided to a non-driving side end portion (second end portion) of the process cartridge PPY at the opposite side from the driving side end portion. The drum bearing 1*a*R and the drum bearing 1*a*L support the photosensitive drum 1.

Note that the longitudinal direction of the process cartridge PPY is the same as the rotation axis direction (longitudinal direction) of the photosensitive drum 1 and the rotation axis direction (longitudinal direction) of the developing roller 3. When describing the apparatus main body 100A and the cartridge tray 40 in the following description, the term "longitudinal direction of the process cartridge PPY" means the longitudinal direction of the process cartridge PPY in a state mounted to a later-described mounting portion 40*a*. In this case, the longitudinal direction of the process cartridge PPY is the direction of movement of the cartridge tray 40, and is the direction orthogonal to the direction of mounting the process cartridges PP in the present embodiment.

The process cartridges PPY, PPM, PPC, and PPK, which are the plurality of cartridges, are detachably mounted to the cartridge tray (tray unit, moving member, moving unit) 40. The cartridge tray 40 is configured to be movable with respect to the apparatus main body 100A, between an internal position situated within the apparatus main body 100A and an external position situated outside of the apparatus main body 100A, in a state of supporting the process cartridges PPY, PPM, PPC, and PPK, which will be described later. In the present embodiment, when the cartridge tray 40 is situated at the internal position, the process cartridges PPY, PPM, PPC, and PPK are situated at image forming positions, and perform image forming operations. When the cartridge tray 40 is situated at the external position, the process cartridges PPY, PPM, PPC, and PPK are situated at mounting/detaching positions, and can be mounted to or detached from the cartridge tray 40.

The printer 100 is provided with the front door (opening/closing member) 31 attached to the apparatus main body 100A. The front door 31 is capable of moving between a closed position of covering the cartridge tray 40 at the internal position and an open position of exposing the cartridge tray 40 at the internal position. By the user opening the front door 31, the cartridge tray 40 is exposed, and the user can access the cartridge tray 40. The user can then bring the process cartridges PPY, PPM, PPC, and PPK to be situated at the mounting/detaching position by drawing the cartridge tray 40 out to the front side, and can replace the process cartridges PPY, PPM, PPC, and PPK.

Image Forming Operations

Next image forming operations of the printer 100 configured in this way will be described. Upon the control portion 200 of the printer 100 receiving job signals from the interface portion 300, an unshown developing separating mechanism provided to the apparatus main body 100A moves in the front-back direction. The developing separating mechanism brings the developing roller 3 into contact with the photosensitive drum 1.

Note that in a job of forming a monochrome image, only the photosensitive drum of the process cartridge PPK comes into contact with the developing roller, while in a job of forming a full-color image, the photosensitive drums of the process cartridges PPY, PPM, PPC, and PPK come into contact with the respective developing rollers. The photosensitive drums, the developing rollers, and the intermediate transfer belt 13 are then driven by the unshown driving force source.

A scanner unit 11 casts a laser beam corresponding to image signals onto the photosensitive drum 1 of the process cartridge PPY. The surface of the photosensitive drum 1 at this time is uniformly charged to a predetermined polarity and potential in advance by a charging member (charging roller) 5, and an electrostatic latent image is formed on the surface by the laser being cast from the scanner unit 11. The electrostatic latent image formed on the photosensitive drum 1 is developed by the developing roller 3, thereby forming a yellow (Y) toner image on the photosensitive drum 1.

Note that the cartridge tray 40 is provided with light guides 57 (see FIG. 5B) as pre-exposing unit. The light guides 57 are each formed of transparent acrylic or the like, for example. Light from an unshown light source is emitted prior to the charging roller 5 charging the surface of the photosensitive drum 1, and this light is cast on the surface of the photosensitive drum 1 in a state of being uniformly dispersed in the longitudinal direction by the light guide 57. Accordingly, the potential at the surface of the photosensitive drum 1 is stabilized, and good toner images can be formed.

In the same way, a laser beam is cast from the scanner unit 11 onto the photosensitive drum in each of the process cartridges PPM, PPC, and PPK, and magenta (M), cyan (C), and black (K) toner images are formed on the respective photosensitive drums. The toner images of the respective colors formed on the respective photosensitive drums are transferred into the intermediate transfer belt 13 by primary transfer bias applied to the primary transfer rollers 17Y, 17M, 17C, and 17K. The full-color toner image transferred onto the intermediate transfer belt 13 is conveyed to the secondary transfer nip T2 by the intermediate transfer belt 13 rotated by the driving roller 14. Note that the image forming processes of each of the colors are performed at timings for overlaying onto the toner image transferred upstream onto the intermediate transfer belt 13 by primary transfer.

In parallel with this image forming process, a sheet S sent out by the sheet feeding portion 18 is subjected to skew correction by a registration roller pair 22. The registration roller pair 22 further conveys the sheet S toward the secondary transfer roller 27, in accordance with the toner image being conveyed by the intermediate transfer belt 13. The full-color toner image on the intermediate transfer belt 13 is transferred onto the sheet S at the secondary transfer nip T2, by the secondary transfer bias applied to the secondary transfer roller 27. Also, after the transfer of the toner image, the toner remaining on the surface of the intermediate transfer belt 13 is removed by the cleaning unit 26, and is recovered to a waste toner recovery container that is omitted from illustration.

The sheet S onto which the toner image is transferred is subjected to predetermined heat and pressure at the fixing nip Q of the fixing device 23. This causes the toner to melt, and subsequently be hardened, thereby fixing the image onto the sheet S. The sheet S that has passed through the fixing device 23 is discharged onto a discharge tray 25 by the discharge roller pair 24.

Cartridge Tray

Figure 4A:
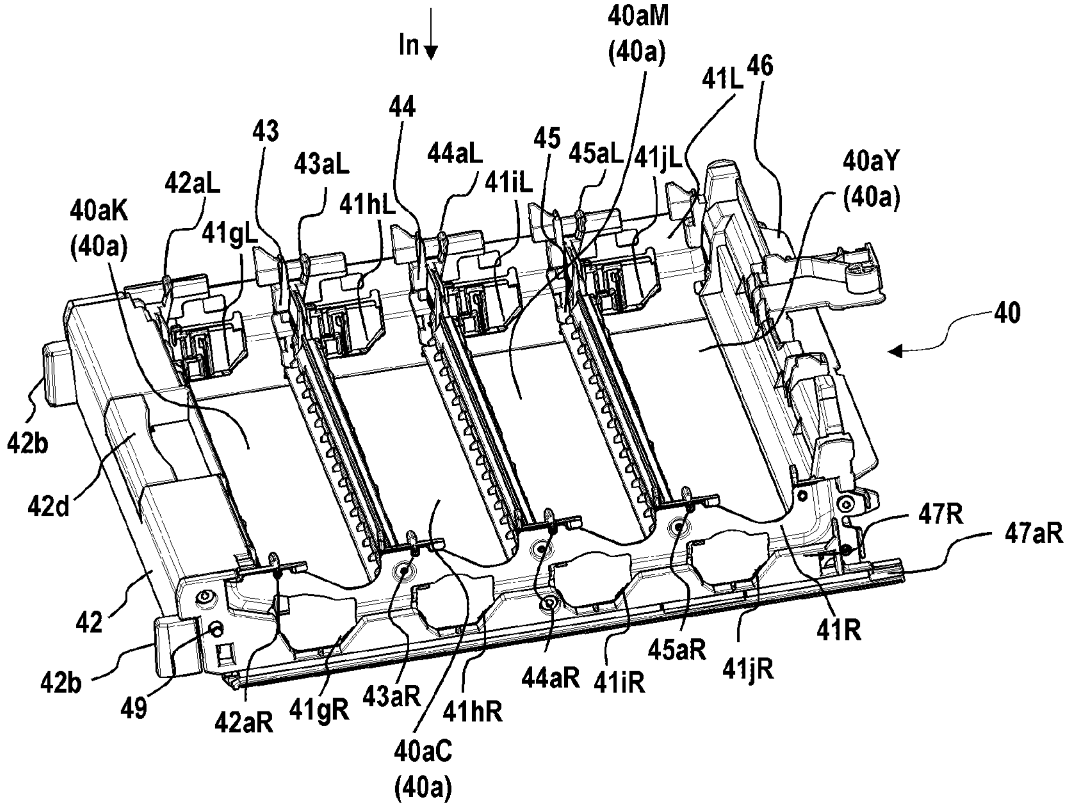
FIGS. 4A and 4B are a frontal perspective view and a rear perspective view illustrating a cartridge tray.
Figure 4B:
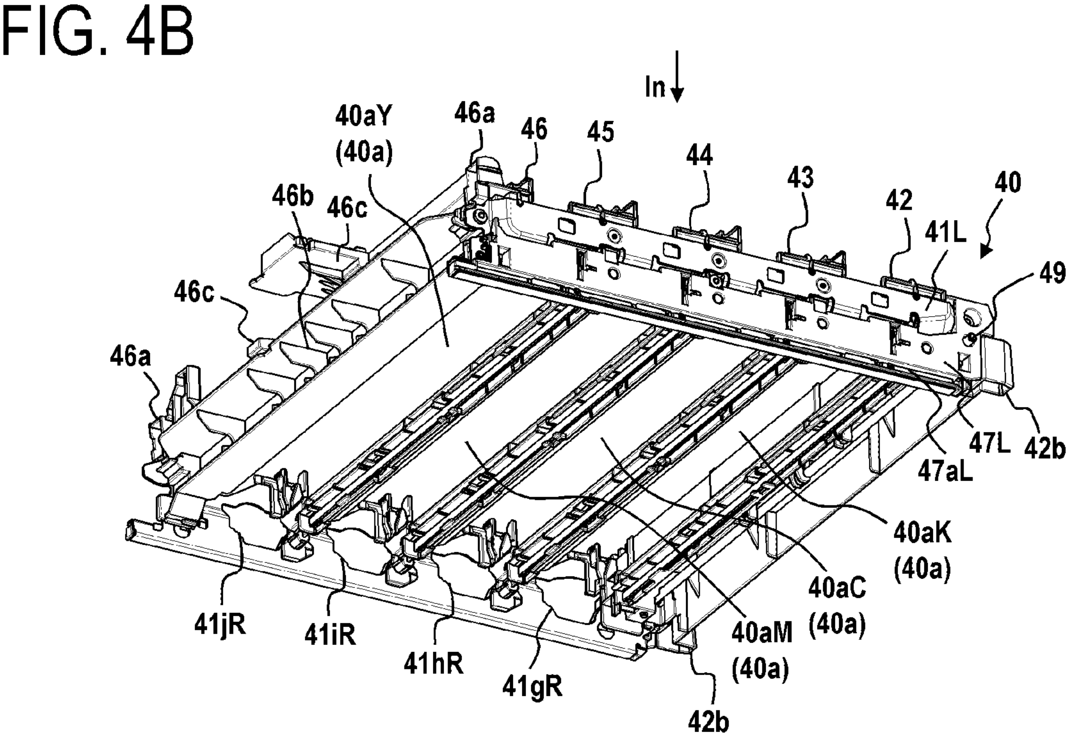

Next, the configuration of the cartridge tray 40 will be described. The cartridge tray 40 has tray side plates 41L and 41R that are disposed with a gap therebetween in the right-left direction, linking members 42, 43, 44, 45, and 46 that link the tray side plates 41L and 41R to each other, and guide members 47L and 47R, as illustrated in FIGS. 4A and 4B. Note that in the following description, members that are provided as pair of right and left members are distinguished regarding right and left by appending "R" or "L" after the signs.

The process cartridges PPY, PPM, PPC, and PPK are supported by the tray side plates 41L and 41R. The mounting portions 40*a* to which the process cartridges PPY, PPM, PPC, and PPK are mounted are formed between the tray side plate (driving-side side plate, first side plate) 41R and the tray side plate (non-driving-side side plate, second side plate) 41L. The process cartridge PPY is mounted to a mounting portion the process cartridge PPM is mounted to a mounting portion 40*a*M, the process cartridge PPC is mounted to a mounting portion 40*a*C, and the process cartridge PPK is mounted to a mounting portion 40*a*K. The process cartridges PPY, PPM, PPC, and PPK are mounted to the mounting portions 40*a*Y, 40*a*M, 40*a*C, and 40*a*K, following the mounting direction (the direction of arrow In).

The linking members 42, 43, 44, 45, and 46 are made of a resin material, and are arrayed in order from the front side toward the rear side. The above-described light guide 57 is provided to each of the linking members 42, 43, 44, and 45. The tray side plates 41L and 41R are made of a metal material. The guide member (driving side cover member, first cover member) 47R is supported by the tray side plate 41R, and the guide member (non-driving side cover member, second cover member) 47L is supported by the tray side plate 41L. The guide member 47R is provided with a guide groove (first guided groove) 47*a*R, and the guide member 47L is provided with a guide groove (second guided groove) 47*a*L. The guide grooves 47*a*L and 47*a*R extend following the direction in which the plurality of cartridges are arrayed, and guide the cartridge tray 40 in the direction of being draw out from, and the direction of being inserted into, the apparatus main body 100A. The guide grooves 47*a*L and 47*a*R also engage unshown stoppers provided to the apparatus main body 100A, thereby restricting the cartridge tray 40 from being drawn out past a predetermined position.

The linking member 42 has receiving portions 42*b* and a gripping portion 42*d*. The user can draw the cartridge tray 40 out from the apparatus main body 100A by gripping the gripping portion 42*d* and pulling. When the printer 100 is subjected to shock from the frontal direction in a state where the front door 31 is closed, the receiving portions 42*b* suppress damage of internal parts of the printer 100 caused by striking the front door 31. In the same way, the linking member 46 has receiving portions 46*a*. When the printer 100 is subjected to shock from the rear direction, the receiving portions 46*a* suppress damage of internal parts of the printer 100 caused by striking a fixing stay 35 (see FIG. 9).

The tray side plates 41L and 41R have shapes in which the upper portions are drawn outwards as compared to the lower portions, with the distance between the tray side plates 41L and 41R in the right-left direction being greater at the upper portion and smaller at the lower portion. Thus, the right-left width of the cartridge tray 40 can be reduced without impeding the ease of insertion/extraction of the process cartridges PPY, PPM, PPC, and PPK, thereby contributing to reduction in size of the printer 100.

Further, the lower sides of the tray side plates 41L and 41R are bent into a shape of the letter L, thereby ensuring strength. Although the tray side plates 41L and 41R and the linking members 42, 43, 44, 45, and 46 are each fastened by screws, this is not restrictive, and thermal caulking or the like may be used. Also, an arrangement may be made in which the linking members 42 and 46 alone are fastened to the tray side plates 41L and 41R, and the linking members 43, 44, and 45 are not fastened to the tray side plates 41L and 41R.

The tray side plate 41R is provided with cartridge engaging portions (first positioning portion) 41*g*R, 41*h*R, 41*i*R, and 41*j*R, the cartridge engaging portions 41*g*R, 41*h*R, 41*i*R, and 41*j*R each being formed having a substantially V-shaped form, as illustrated in FIGS. 4A through 5B. Specifically, the cartridge engaging portions 41*g*R, 41*h*R, 41*i*R, and 41*j*R are formed so that front-side inclined faces thereof are at a 65° angle as to the direction of drawing out, and rear-side inclined faces thereof are at a 45° angle.

The tray side plate 41L is provided with cartridge engaging portions (second positioning portion) 41*g*L, 41*h*L, 41*i*L, and 41*j*L, the cartridge engaging portions 41*g*L, 41*h*L, 41*i*L, and 41*j*L being formed having substantially V-shaped forms, as illustrated in FIG. 4A. Specifically, the cartridge engaging portions 41*g*L, 41*h*L, 41*i*L, and 41*j*L are formed so that front-side inclined faces thereof are at a 65° angle as to the direction of drawing out, and rear-side inclined faces thereof are at a 45° angle.

The process cartridges PPY, PPM, PPC, and PPK are positioned by the cartridge tray 40 at image forming positions to perform image forming operations. While image forming operations are performed, the drum bearing 1*a*R (see FIG. 3A) of the process cartridge PPY comes into contact with the cartridge engaging portion 41*g*R, and the drum bearing 1*a*L (see FIG. 3B) of the process cartridge PPY comes into contact with the cartridge engaging portion 41*g*L. In the same way, the drum bearings laR of the process cartridges PPM, PPC, and PPK come into contact with the cartridge engaging portions 41*h*R, 41*i*R, and 41*j*R. Also, the drum bearings 1*a*L of the process cartridges PPM, PPC, and PPK come into contact with the cartridge engaging portions 41*h*L, 41*i*L, and 41*j*L. That is to say, the cartridge engaging portion 41*g*R and the cartridge engaging portion 41*g*L come into contact with and support the drum bearing 1*a*R and the drum bearing 1*a*L of the process cartridge PPY, so that the process cartridge PPY is positioned at the image forming position. In the same way, the cartridge engaging portions 41*h*R, 41*i*R, and 41*j*R and the cartridge engaging portions 41*h*L, 41*i*L, and 41*j*L come into contact with and support the drum bearings 1*a*R and the drum bearings 1*a*L of the process cartridges PPM, PPC, and PPK.

The process cartridges PPY, PPM, PPC, and PPK are positioned as to the cartridge tray 40, either under their own weight, or be being pressed downward by pressing units 33 and 34 (first pressing member 34, second pressing member 33) (FIGS. 14A through 20B). The pressing units 33 and 34 position the process cartridges, and the cartridge tray 40 that is integral with the process cartridges, as to the apparatus main body 100A, by pressing the process cartridges in the downward direction at the time of forming images. The pressing units 33 and 34 are assembled to the apparatus main body 100A so as to be capable of moving between a pressing position of pressing the process cartridges and a separated position of being separated from the process cartridges, in interrelation with opening and closing actions of the front door 31 of the printer 100, which will be described later in detail.

Also, boss portions 42*a*L, 43*a*L, 44*a*L, and 45*a*L are respectively formed to the left end portions of the linking members 42, 43, 44, and 45, and boss portions 42*a*R, 43*a*R, 44*a*R, and 45*a*R are respectively formed to the right end portions thereof. Note that groove portions 1*d*R and 1*d*L are formed on the right and left end portions of the process cartridges for each of the colors, as illustrated in FIGS. 3A and 3B. The groove portions 1*d*R and 1*d*L of the process cartridges PPY, PPM, PPC, and PPK then engage the boss portions 42*a*L, 43*a*L, 44*a*L, and 45*a*L at the left end side, and engage the boss portions 42*a*R, 43*a*R, 44*a*R, and 45*a*R at the right end side. Thus, the process cartridges PPY, PPM, PPC, and PPK are suppressed from rotating as to the cartridge tray 40.

Thus, the process cartridges PPY, PPM, PPC, and PPK are mounted to the cartridge tray 40, and each process cartridge is grounded by a wire member (drum ground) 48 provided to the guide member 47L.

Details of Cartridge Tray

Figure 6A:
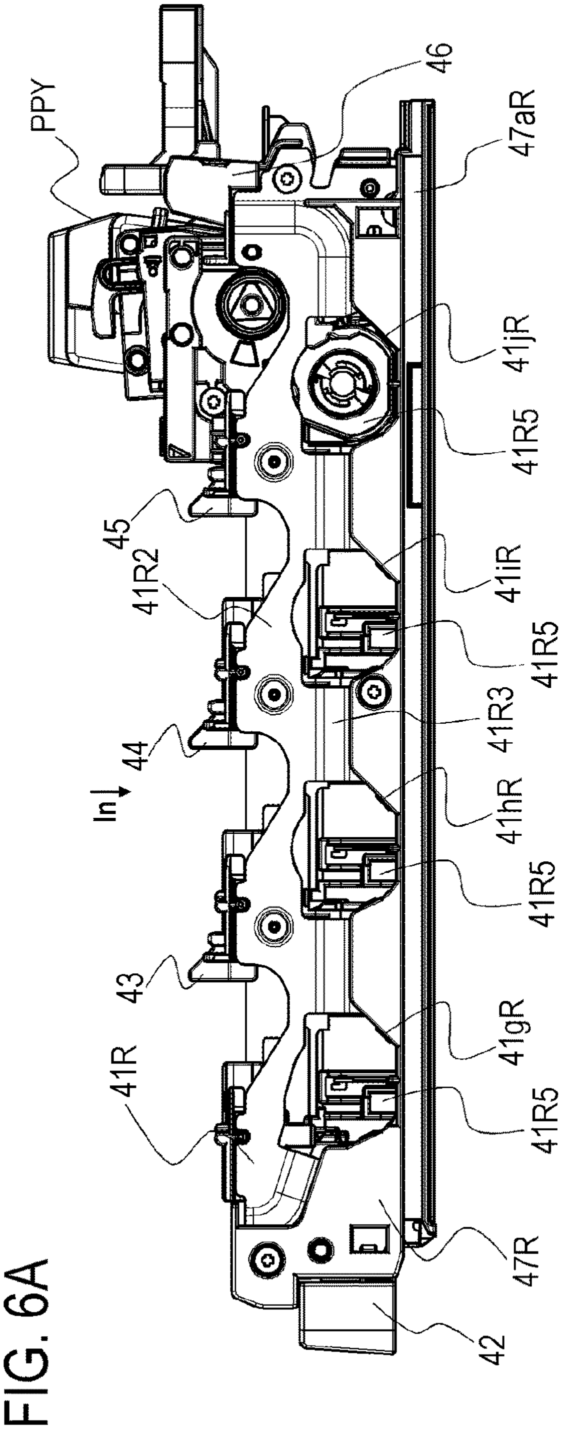
FIGS. 6A and 6B are side views illustrating a driving side of the cartridge tray.
Figure 6B:
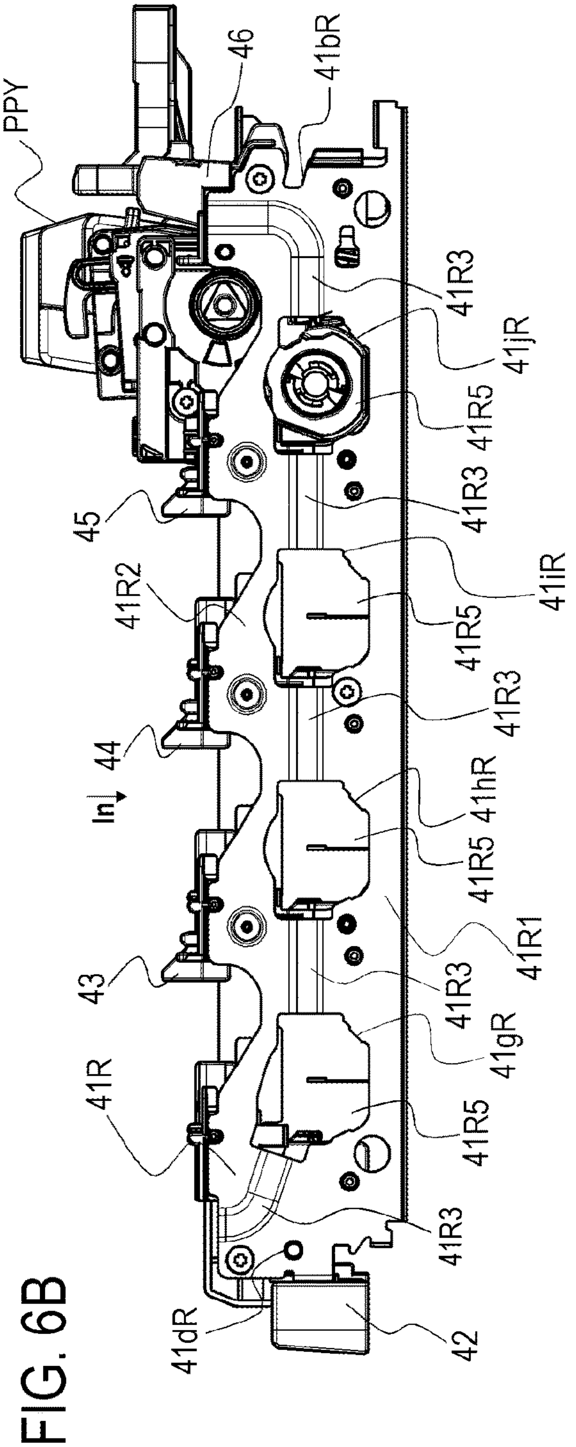
Figure 7A:
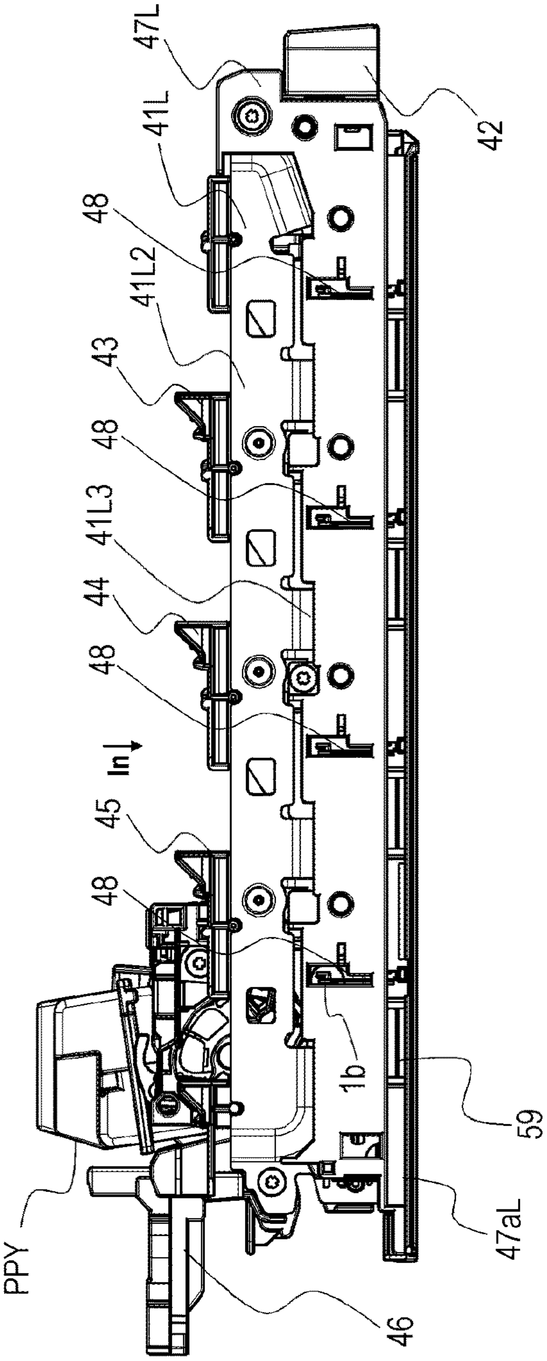
FIGS. 7A and 7B are side views illustrating a non-driving side of the cartridge tray.
Figure 7B:
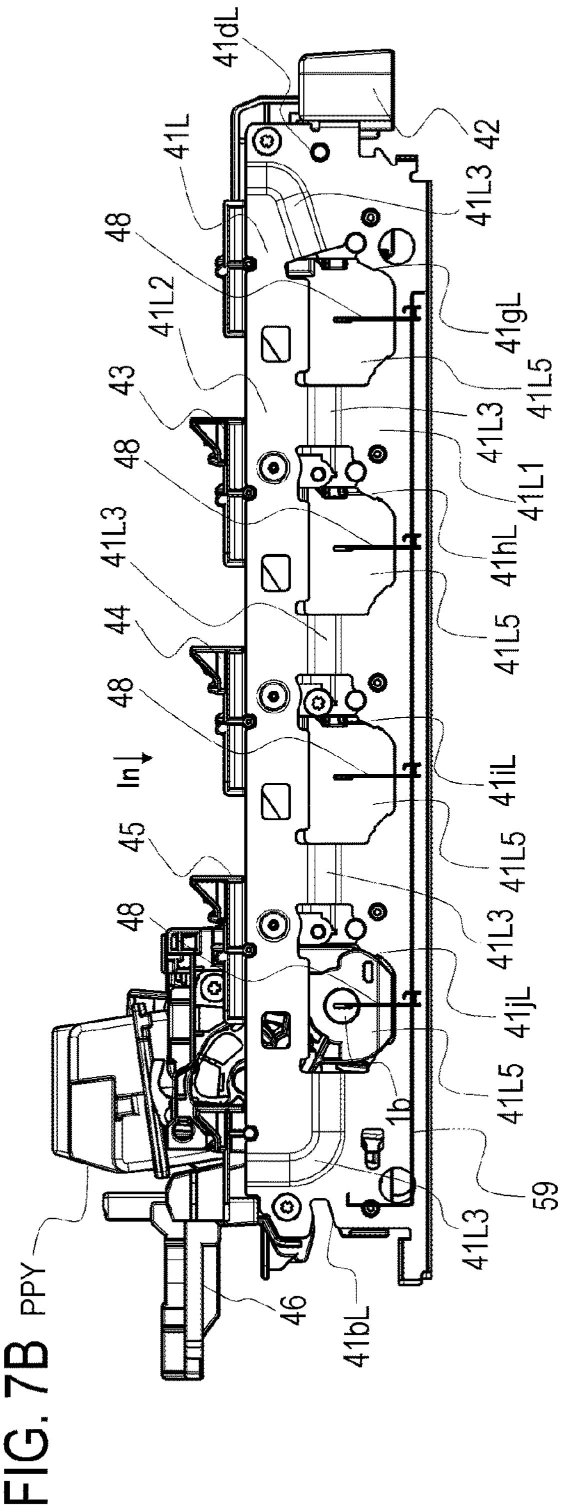
Figure 8:
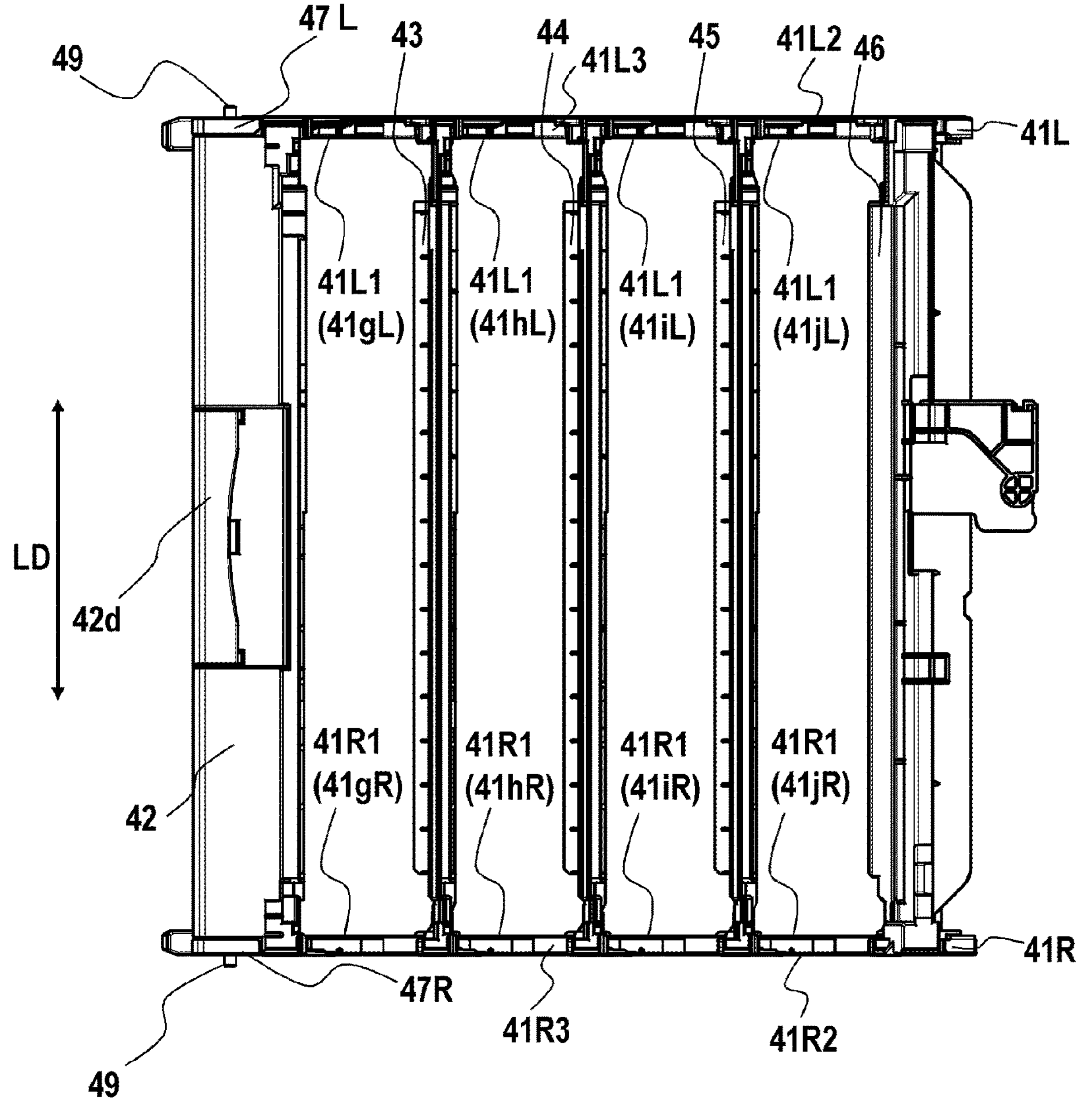
FIG. 8 is a top view of the cartridge tray.

Details of the cartridge tray 40 will be described with reference to FIGS. 6A through 8. FIGS. 6A and 6B are side views illustrating the driving side of the cartridge tray 40. FIGS. 6A and 6B are diagrams viewing the cartridge tray 40 along the longitudinal direction of the process cartridge PPY, and the guide member 47R is not illustrated in FIG. 6B. FIGS. 7A and 7B are side views illustrating the non-driving side of the cartridge tray 40. FIGS. 7A and 7B are diagrams viewing the cartridge tray 40 along the longitudinal direction of the process cartridge PPY, and the guide member 47L is not illustrated in FIG. 7B. FIG. 8 is a top view of the cartridge tray 40. FIG. 8 is a diagram viewing the cartridge tray 40 along the mounting direction In of the process cartridges PPY, PPM, PPC, and PPK.

The tray side plate 41R is provided with a first supporting portion 41R1 that has the cartridge engaging portions 41*g*R, 41*h*R, 41*i*R, and 41*j*R, a first outer side portion 41R2, and a first connecting portion 41R3 that connects the first supporting portion 41R1 and the first outer side portion 41R2, as illustrated in FIG. 6B. The tray side plate 41R is made of metal. In the present embodiment, the tray side plate 41R is one metal plate, and is integrally provided with the first supporting portion 41R1, the first outer side portion 41R2, and the first connecting portion 41R3. The first supporting portion 41R1 and the first outer side portion 41R2 extend following the moving direction in which the cartridge tray 40 moves as to the apparatus main body 100A.

The tray side plate 41R is formed by drawing on a metal plate. As a result, the first connecting portion 41R3 has a portion situated between the first supporting portion 41R1 and the first outer side portion 41R2 in the horizontal direction, and a portion situated between the first supporting portion 41R1 and the first outer side portion 41R2 in the vertical direction, as viewed in the longitudinal direction of the process cartridge PPY. Further, the tray side plate 41R is provided with first openings 41R5. The cartridge engaging portions 41*g*R, 41*h*R, 41*i*R, and 41*j*R are formed in the first openings 41R5. The upper end of the first openings 41R5 is situated higher than the lower end of the first outer side portion 41R2, and the lower end of the first openings 41R5 is situated lower than the upper end of the first supporting portion 41R1 and the first connecting portion 41R3, with respect to the vertical direction. The process cartridges PPY, PPM, PPC, and PPK are exposed to the outside of the mounting portions 40*a* through the first openings 41R5. More specifically, the drum couplings 1*c* of the process cartridges PPY, PPM, PPC, and PPK are externally exposed from the cartridge tray 40 through the first openings 41R5.

As illustrated in FIG. 6A, the cartridge tray 40 has the guide member (first cover member) 47R that is attached to the tray side plate 41R on the outer side of the mounting portions 40*a*. The guide member 47R covers the first supporting portion 41R1. More specifically, the guide member 47R covers the first supporting portion 41R1 such that the cartridge engaging portions 41*g*R, 41*h*R, 41*i*R, and 41*j*R are exposed when viewed in the longitudinal direction of the process cartridge PPY.

Also, as described above, the guide member 47R is provided with the guide groove (first guided groove) 47*a*R. The guide groove 47*a*R is situated on the downstream side of the cartridge engaging portions 41*g*R, 41*h*R, 41*i*R, and 41*j*R in the mounting direction In of the process cartridges PPY, PPM, PPC, and PPK. The guide groove 47*a*R extends in the direction in which the process cartridges PPY, PPM, PPC, and PPK are arrayed. Accordingly, the cartridge tray 40 is capable of moving as to the apparatus main body 100A in the direction in which the process cartridges PPY, PPM, PPC, and PPK are arrayed.

The tray side plate 41L is provided with a second supporting portion 41L1 that has the cartridge engaging portions 41gL, 41*h*L, 41*i*L, and 41*j*L, a second outer side portion 41L2, and a second connecting portion 41L3 that connects the second supporting portion 41L1 and the second outer side portion 41L2, as illustrated in FIG. 7B. The tray side plate 41L is made of metal. In the present embodiment, the tray side plate 41L is one metal plate, and is integrally provided with the second supporting portion 41L1, the second outer side portion 41L2, and the second connecting portion 41L3. The second supporting portion 41L1 and the second outer side portion 41L2 extend along the moving direction in which the cartridge tray 40 moves as to the apparatus main body 100A.

The tray side plate 41L is formed by drawing on a metal plate. As a result, the second connecting portion 41L3 has a portion situated between the second supporting portion 41L1 and the second outer side portion 41L2 in the horizontal direction, and a portion situated between the second supporting portion 41L1 and the second outer side portion 41L2 in the vertical direction, as viewed in the longitudinal direction of the process cartridge PPY. Further, the tray side plate 41L is provided with second openings (contact openings) 41L5. The cartridge engaging portions 41gL, 41*h*L, 41*i*L, and 41*j*L are formed in the second openings 41L5. The upper end of the second openings 41L5 is situated higher than the lower end of the second outer side portion 41L2, and the lower end of the second openings 41L5 is situated lower than the upper end of the second supporting portion 41L1 and the second connecting portion 41L3, with respect to the vertical direction. The process cartridges PPY, PPM, PPC, and PPK are exposed to the outside of the mounting portions 40*a* through the second openings 41L5. More specifically, the grounding members 1*b* of the process cartridges PPY, PPM, PPC, and PPK are externally exposed from the mounting portions 40*a* through the second openings 41L5.

As illustrated in FIG. 7A, the cartridge tray 40 has the guide member (second cover member) 47L that is attached to the tray side plate 41L on the outer side of the mounting portions 40*a*. The guide member 47L covers the second supporting portion 41L1. More specifically, the guide member 47L covers the second supporting portion 41L1 such that at least part of the second openings 41L5 is covered as viewed in the longitudinal direction of the process cartridge PPY. The guide member 47L is also provided with the wire members 48. The wire members 48 are disposed at positions that overlap the second openings 41L5 as viewed in the longitudinal direction of the process cartridge PPY.

Also, the guide member 47L is provided with the guide groove (second guided groove) 47*a*L, as described above. The guide groove 47*a*L is situated on the downstream side of the cartridge engaging portions 41*g*L, 41*h*L, 41*i*L, and 41*j*L in the mounting direction In of the process cartridges PPY, PPM, PPC, and PPK. The guide groove 47*a*L extends in the direction in which the process cartridges PPY, PPM, PPC, and PPK are arrayed. Accordingly, the cartridge tray 40 is capable of moving as to the apparatus main body 100A in the direction in which the process cartridges PPY, PPM, PPC, and PPK are arrayed.

As illustrated in FIG. 8, when viewed in the mounting direction In, the first supporting portions 41R1 and the second supporting portions 41L1 are situated between the first outer side portion 41R2 and the second outer side portion 41L2 in the longitudinal direction (arrow LD) of the process cartridges PP mounted to the mounting portion 40*a*. Also, when viewed in the mounting direction In, the cartridge engaging portions 41*g*R, 41*h*R, 41*i*R, and 41*j*R are exposed to the upstream side (near side in the plane of the figure) in the mounting direction In via the first openings 41R5. In the same way, the cartridge engaging portions 41*g*L, 41*h*L, 41*i*L, and 41*j*L are exposed to the upstream side (near side in the plane of the figure) in the mounting direction In via the second openings 41L5.

Positioning Configuration of Cartridge Tray

Figure 9:
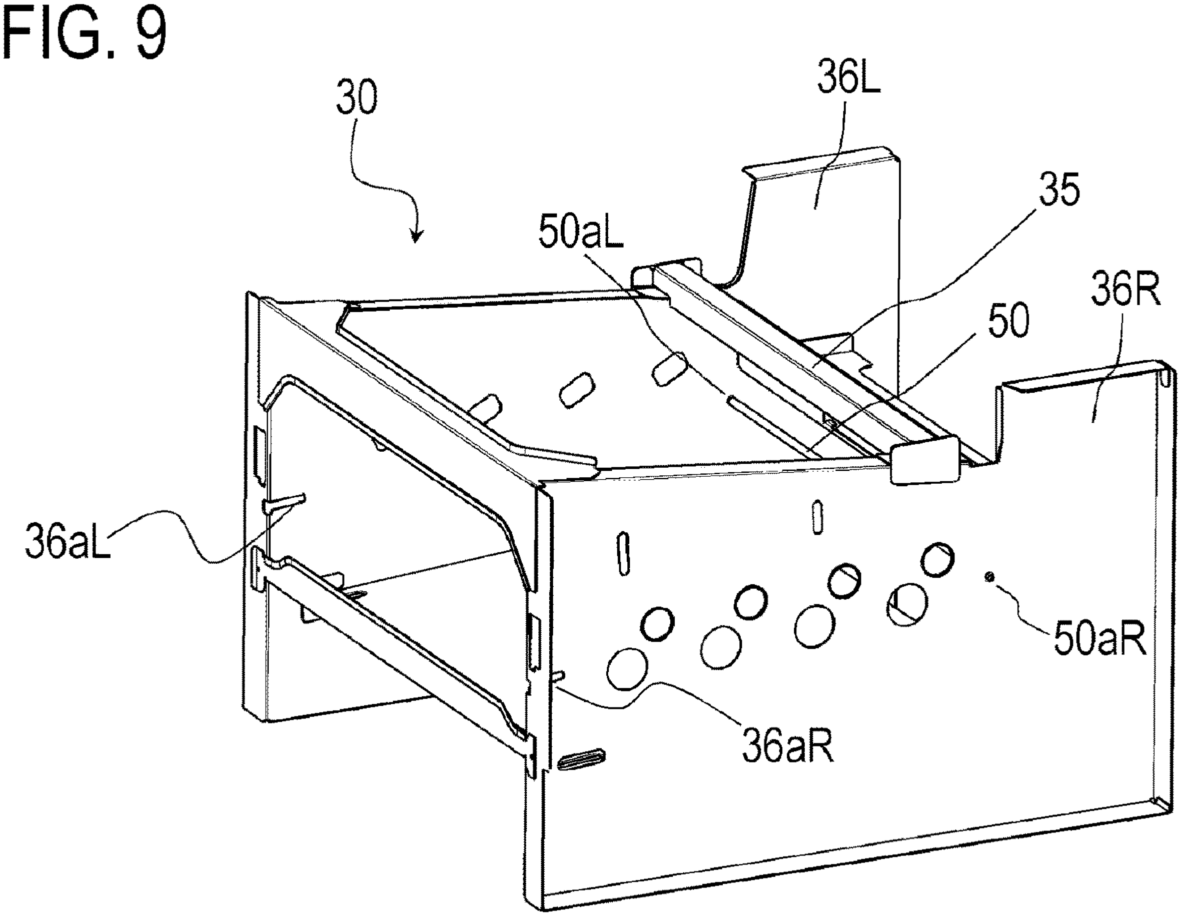
FIG. 9 is a perspective view illustrating a frame structure of a printer main body.

Next, a positioning configuration of the cartridge tray 40 will be described. The apparatus main body 100A (see FIG. 1) has a main body frame 30 having a pair of left and right main body side plates 36L and 36R, the fixing stay 35 that links the main body side plates 36L and 36R and also compartmentalizes a process region and a fixing region, as illustrated in FIG. 9. The process region is a region where the process cartridges PPY, PPM, PPC, and PPK are accommodated, and the fixing region is a region where the fixing device 23 is accommodated. The main body side plates 36L and 36R and the fixing stay 35 are made of a metal material.

The main body side plates 36L and 36R have shaft supporting portions 50*a*L and 50*a*R, respectively, at the deep side of the apparatus, with a positioning shaft 50 being supported by the shaft supporting portions 50*a*L and 50*a*R. Note that the positioning shaft 50 is immovably fixed to the shaft supporting portions 50*a*L and 50*a*R, but may be rotatably supported as long as it is not capable of moving in the front-back direction and the up-down direction.

Figure 10:
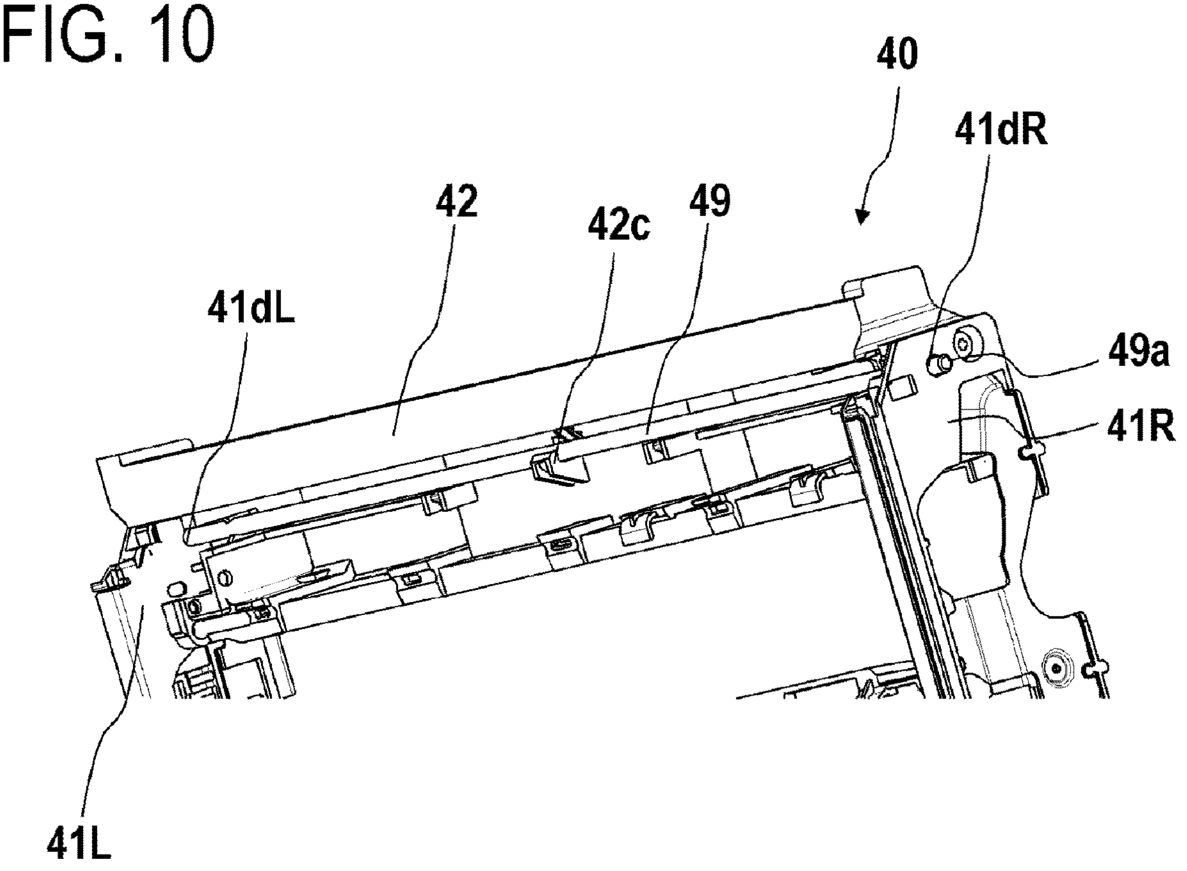
FIG. 10 is a bottom perspective view illustrating a positioning shaft of the cartridge tray.

The main body side plates 36L and 36R also have positioning grooves 36*a*L and 36*a*R respectively, at the apparatus front side thereof. Shaft supporting portions 41*d*L and 41*d*R are respectively formed at the front side of the tray side plates 41L and 41R of the cartridge tray 40, as illustrated in FIG. 10. A positioning shaft 49 is supported by the shaft supporting portions 41*d*L and 41*d*R. The positioning shaft 49 passes through the tray side plates 41L and 41R, with a left-side end portion 49*a* and right-side end portion (omitted from illustration) of the positioning shaft 49 protruding to the outer side of the tray side plates 41L and 41R. Note that the positioning shaft 49 is immovably fixed to the shaft supporting portions 41*d*L and 41*d*R, but may be rotatably supported as long as it is not capable of moving in the front-back direction and the up-down direction. Also, the positioning shafts 49 and 50 are configured of round rod-shaped shafts that extend in the right-left direction and have a circular cross-sectional shape, but the shapes thereof are not limited.

A shaft contact portion 42*c* that supports the substantially middle portion of the positioning shaft 49 in the axial direction from beneath is formed on the linking member 42. The shaft contact portion 42*c* restricts downward deflection of the positioning shaft 49. Note that the shaft contact portion 42*c* is not limited to being at the substantially middle portion in the axial direction of the positioning shaft 49 and may support the positioning shaft 49 from below at another position. However, restricting downward deflection of the positioning shaft 49 at the middle portion of the positioning shaft 49 is suitable. Also, the shaft contact portion 42*c* maybe formed long in the axial direction.

Figure 11A:
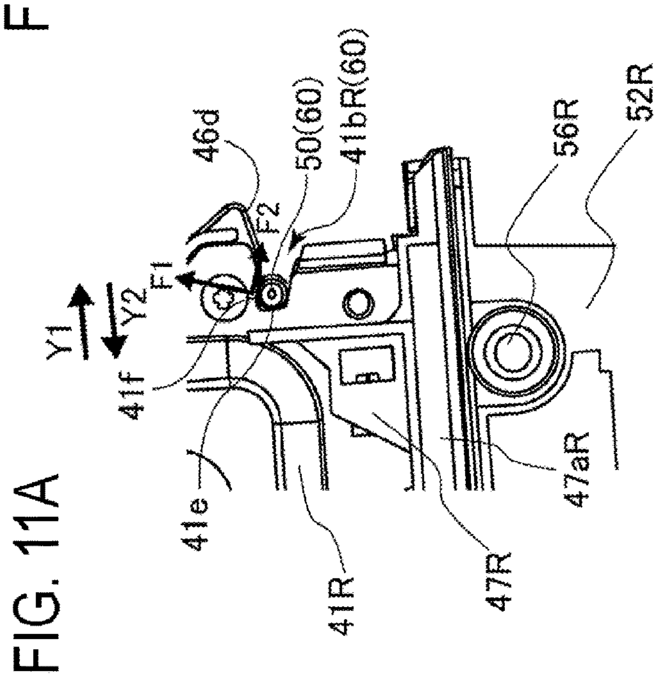
FIG. 11A is a cross-sectional view illustrating a state in which a positioning shaft at an apparatus main body side is engaged with a positioning groove.
Figure 11B:
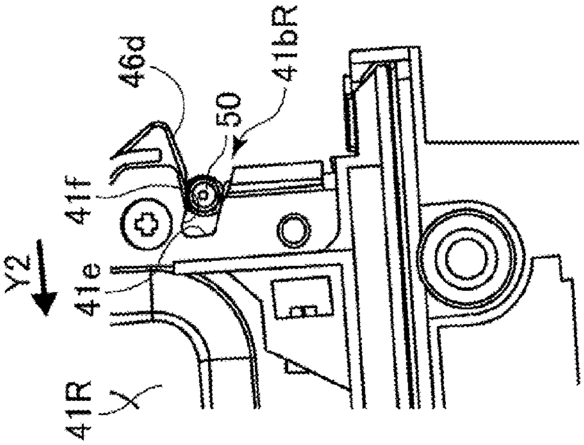
FIG. 11B is a cross-sectional view illustrating the positioning shaft and the positioning groove in a state in which the cartridge tray is slightly drawn out from the mounted state.
Figure 11C:
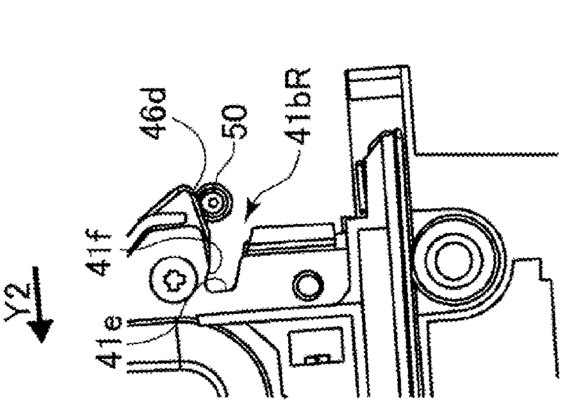
FIG. 11C is a cross-sectional view illustrating the positioning shaft and the positioning groove in a state in which the cartridge tray is further drawn out from the state in FIG. 11B.
Figure 11D:
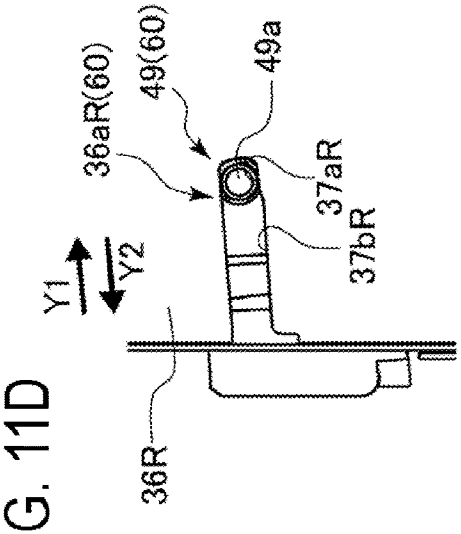
FIG. 11D is a cross-sectional view illustrating a state in which the positioning shaft of the cartridge tray side is engaged with the positioning groove.

The positioning groove 36*a*R of the main body side plate 36R is formed following the insertion direction Y1 of the cartridge tray 40, and has a fitting groove 37*a*R formed at the deep side, and a guide groove 37*b*R formed at the near side, as illustrated in FIG. 11D.

The fitting groove 37*a*R has a width that is the same as or slightly smaller than the outer diameter of the positioning shaft 49, and fits to the end portion 49*a* of the positioning shaft 49 when the cartridge tray 40 is situated at a mounted position. The guide groove 37*b*R has a width that is larger than the outer diameter of the positioning shaft 49, and guides the end portion 49*a* of the positioning shaft 49 to the fitting groove 37*a*R when mounting the cartridge tray 40 to the apparatus main body 100A. Note that a guide groove and a fitting groove are formed in the same way for the main body side plate 36L, and guide and fit the left-side end portion of the positioning shaft 49.

Figure 5A:
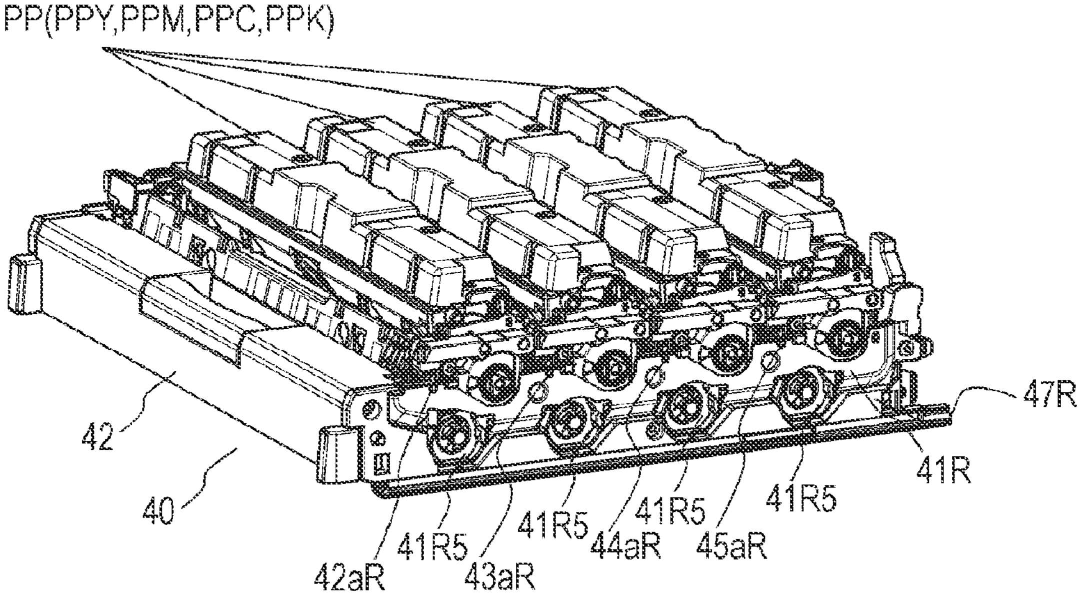
FIGS. 5A and 5B are a frontal perspective view and a rear perspective view illustrating a cartridge tray in a state in which process cartridges are mounted.
Figure 5B:
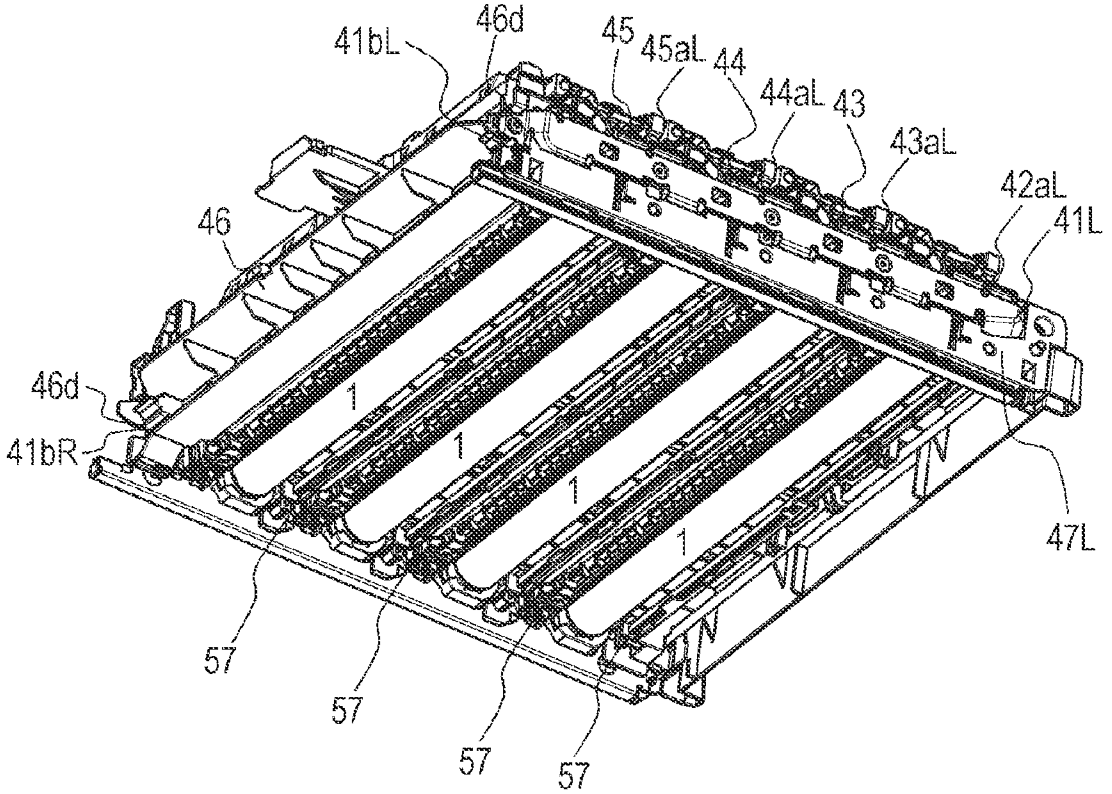

Positioning grooves 41*b*L and 41*b*R are respectively formed at the deep-sides of the tray side plates 41L and 41R, as illustrated in FIG. 5B. The positioning grooves 41*b*L and 41*b*R position the cartridge tray 40 by engaging the positioning shaft 49. FIGS. 11A through 11C are enlarged views illustrating the positioning groove 41*b*R. Note that since the positioning grooves 41*b*L and 41*b*R are of the same configuration, description will be made regarding the positioning groove 41*b*R alone, and description of the positioning groove 41*b*L will be omitted.

The positioning groove 41*b*R has an inclined face 41*f*, and a positioning face 41*e* formed continuing from the inclined face 41*f*, as illustrated in FIGS. 11A through 11C. The positioning face 41*e* extends in a direction substantially perpendicular to the insertion direction Y1 of the cartridge tray 40, and positions the cartridge tray 40 in the insertion direction by abutting the positioning shaft 50. The inclined face 41*f* inclines downward toward the insertion direction Y1. Also, a sliding face 46*d* (see FIG. 5B) is formed on the linking member 46 of the cartridge tray 40, with the sliding face 46*d* being formed to continue from the inclined face 41*f* to the near side.

When the cartridge tray 40 is mounted, the inclined face 41*f* is subjected to reactive force F1 from the positioning shaft 50 due to downward force being applied from the own weight of the cartridge tray 40 and the pressing units 33 and 34 (see FIG. 14A), as illustrated in FIG. 11A. The reactive force F1 contains component force of the insertion direction Y1, and accordingly the cartridge tray 40 is drawn inward in the insertion direction Y1, and moves in a direction F2. Thus, the positioning face 41*e* is pressed against the positioning shaft 50, and can precisely position the cartridge tray 40 as to the apparatus main body 100A. In this way, the inclined face 41*f* is formed to generate component force.

Figure 12:
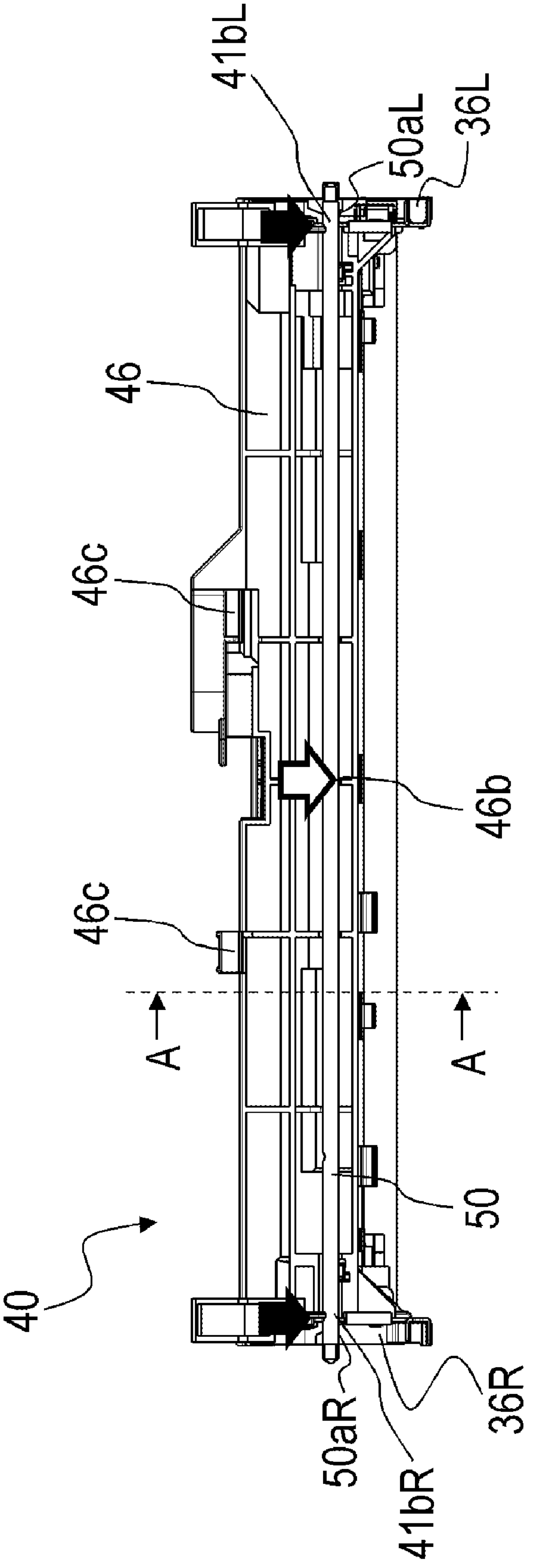
FIG. 12 is a frontal view illustrating a rib provided to the cartridge tray.

The positioning shaft 50 is supported by the shaft supporting portions 50*a*L and 50*a*R of the main body side plates 36L and 36R, as illustrated in FIG. 12. In a state in which the cartridge tray 40 is mounted to the apparatus main body 100A, the positioning grooves 41*b*L and 41*b*R are situated on an inner side from the shaft supporting portions 50*a*L and 50*a*R in the axial direction. Accordingly, the middle portion of the positioning shaft 50 may exhibit downward (direction of outline arrow in FIG. 12) deflection under downward force from the own weight of the cartridge tray 40 and the pressing units 33 and 34 (see FIG. 14A).

Accordingly, a rib 46*b* is formed at the substantially middle portion of the linking member 46 in the axial direction (right-left direction) in the present embodiment. The rib 46*b* restricts downward deflection of the positioning shaft 50 by coming into contact with the substantially middle portion of the positioning shaft 50 in the axial direction and supporting from below. Note that the rib 46*b* is not limited to being at the substantially middle portion of the positioning shaft 50 in the axial direction and may support the positioning shaft 50 from below at another position thereof. However, restricting downward deflection of the positioning shaft 50 at the middle portion of the positioning shaft 50 is suitable. Also, the rib 46*b* may be formed long in the axial direction, or a plurality of ribs 46*b* may be provided along the axial direction. Also, although downward deflection is restricted in the present embodiment, since the positioning shaft 50 is subjected to force in the gravitational direction. However, the arrangement does not have to come into contact with the lower portion of the positioning shaft 50, as long as force in a direction of deflection of the positioning shaft 50 is received and deflection of the positioning shaft 50 is restricted.

Figure 13:
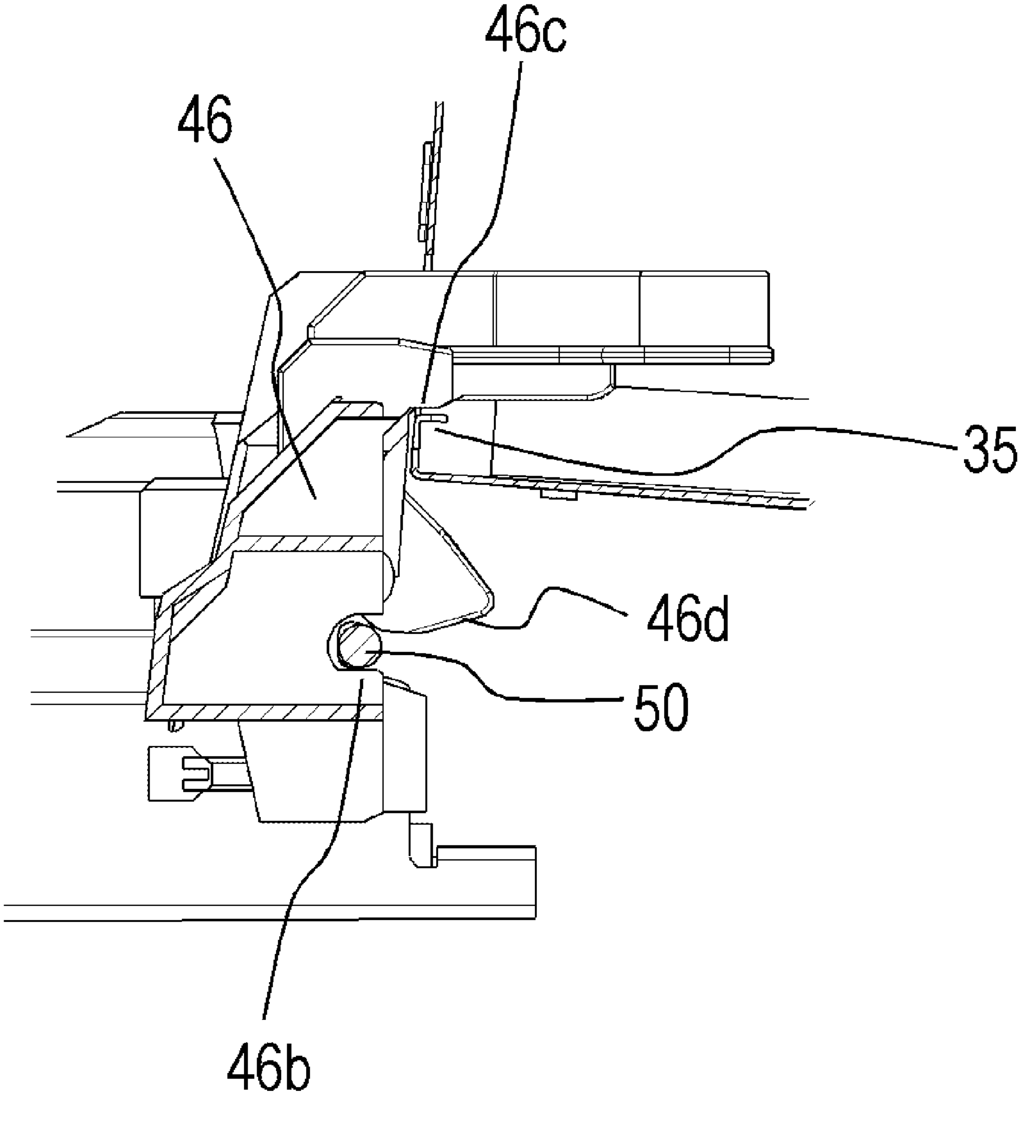
FIG. 13 is a view along arrows A in FIG. 12.

Also, retaining portions 46*c* arranged to retain the fixing stay 35 are formed on the linking member 46, as illustrated in FIGS. 12 and 13. The retaining portions 46*c* can restrict downward deflection of the cartridge tray 40 including the linking member 46 by retaining the fixing stay 35. Suppressing downward deflection of the cartridge tray 40 also suppresses deformation of the cartridge tray 40 at the positioning grooves 41*b*L and 41*b*R, and the cartridge tray 40 can be precisely positioned as to the positioning shaft 50. Note that just one retaining portion 46*c*, or three or more retaining portions 46*c* may be provided without impeding the mounting operations of the cartridge tray 40. Also, one retaining portion 46*c* may be formed long in the axial direction (right-left direction).

Operations of Drawing Out and Mounting Cartridge Tray

Next, the operations of drawing out and mounting the cartridge tray 40 will be described. Once the developer in the process cartridges PPY, PPM, PPC, and PPK has been consumed to a degree where images of quality that satisfy the purchasing user can no longer be formed, the product value as process cartridges is lost.

Accordingly, an arrangement may be made in which unit (omitted from illustration) detecting remaining developer amount of each of the process cartridges is provided, for example, and the control portion 200 compares detected remaining amount values with threshold values set in advance, for cartridge lifespan notices and lifespan warnings. In this arrangement, a display regarding lifespan notice or lifespan warning regarding that process cartridge is displayed on a display portion (omitted from illustration) regarding process cartridges of which the detected remaining amount value is a remaining amount value below the threshold value, prompting the user to replace the process cartridge. The user thereupon opens the front door 31 of the printer 100, draws out the cartridge tray 40 to the outside of the apparatus, and replaces the process cartridges PPY, PPM, PPC, and PPK. Operations of drawing out and mounting the cartridge tray 40 will be described below in detail.

The front door 31 is supported so as to be capable of opening and closing as to the apparatus main body 100A, as illustrated in FIGS. 14A through 15B. The opened state can be maintained by door links 32L and 32R linking between the front door 31 and the apparatus main body 100A.

When the user opens the front door 31, the transfer unit 12 rotates around 1° centered on the driving roller 14, by a plurality of link members that are omitted from illustration cooperatively moving via the door links 32L and 32R. Accordingly, the photosensitive drums 1 of the process cartridges are separated from the intermediate transfer belt 13, as illustrated in FIG. 16C.

Figure 20A:
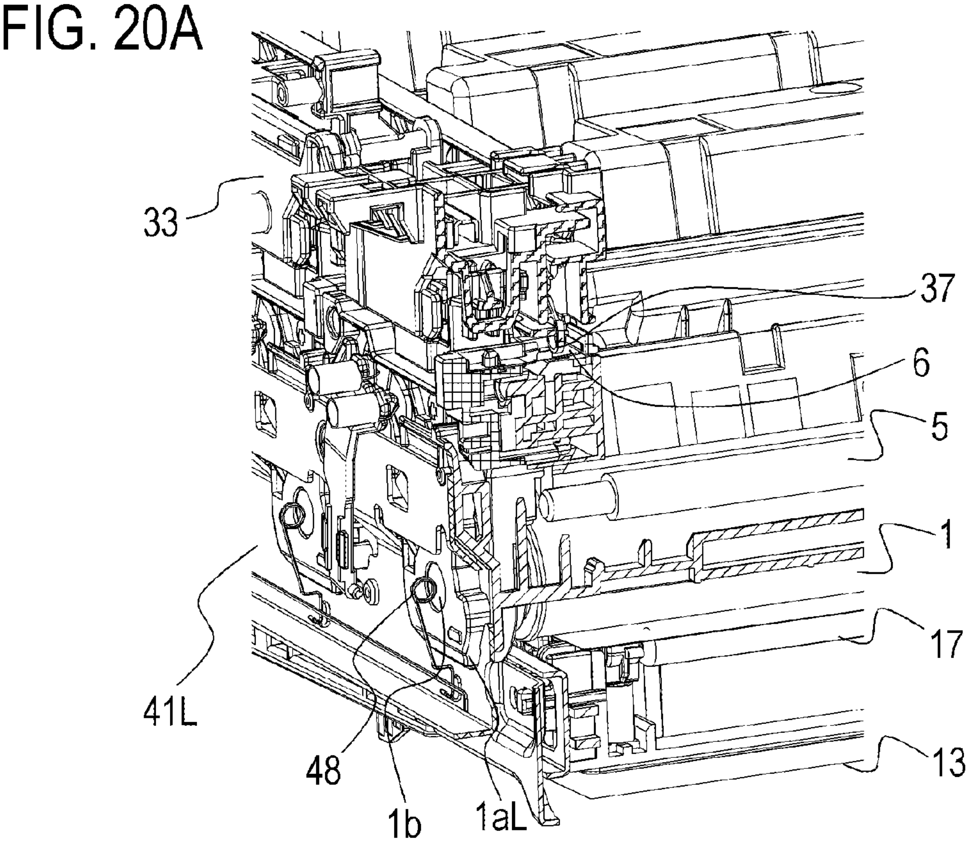
FIGS. 20A and 20B are diagrams illustrating a positional relation between a contact portion for power supply to a charging roller, and a photosensitive drum and so forth.
Figure 20B:
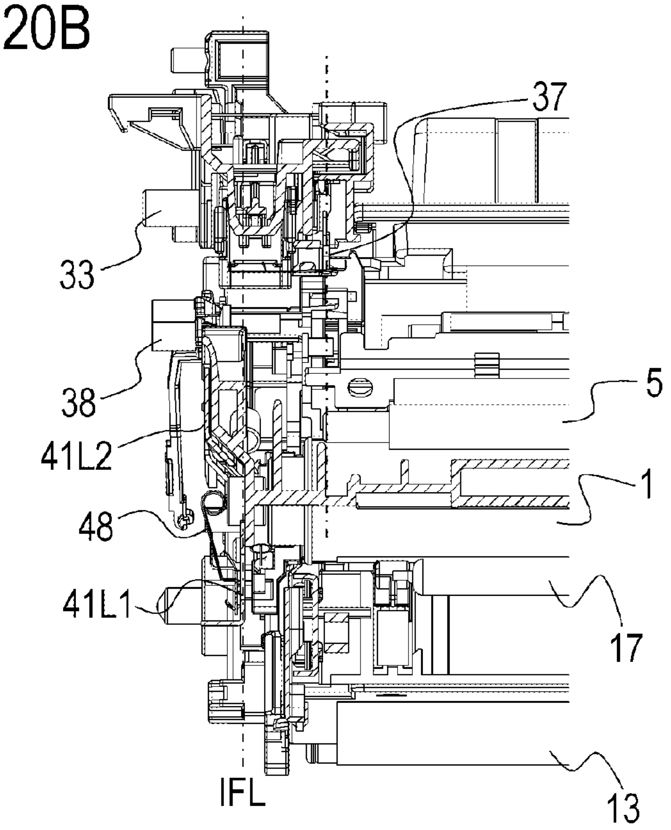

Next, the main body developing contacts 38 provided to the left side (non-driving side) of the apparatus main body 100A are retracted from the cartridge developing contacts 2 electrically connected to the developing rollers 3 (see FIG. 3B), and pressure of the pressing units 33 and 34 is released, as illustrated in FIG. 20B. That is to say, the pressing unit 33 serving as a second pressing member moves from a second pressing position to a second separated position, and also the pressing unit 34 serving as a first pressing member moves from a first pressing position to a first separated position. Next, engagement of the drum couplings 1*c* at the driving side of the process cartridges and the developing couplings 3*c* (FIG. 3A) is disengaged, and also pressing of the cartridge tray 40 by tray pressing units 51 is released, as illustrated in FIGS. 14B and 16B. As a result, the cartridge tray 40 is in a state in which it can be removed to the outside of the apparatus main body 100A.

Now, the tray pressing units 51 are provided to each of holders 52L and 52R supported by the main body side plates 36L and 36R, and press the cartridge tray 40 toward the front side from the back side, when forming images. The tray pressing units 51 each has a tray pressing lever 53, a tray pressing link 54, and a biasing spring (omitted from illustration), as illustrated in FIGS. 16A and 16B.

Figure 16A:
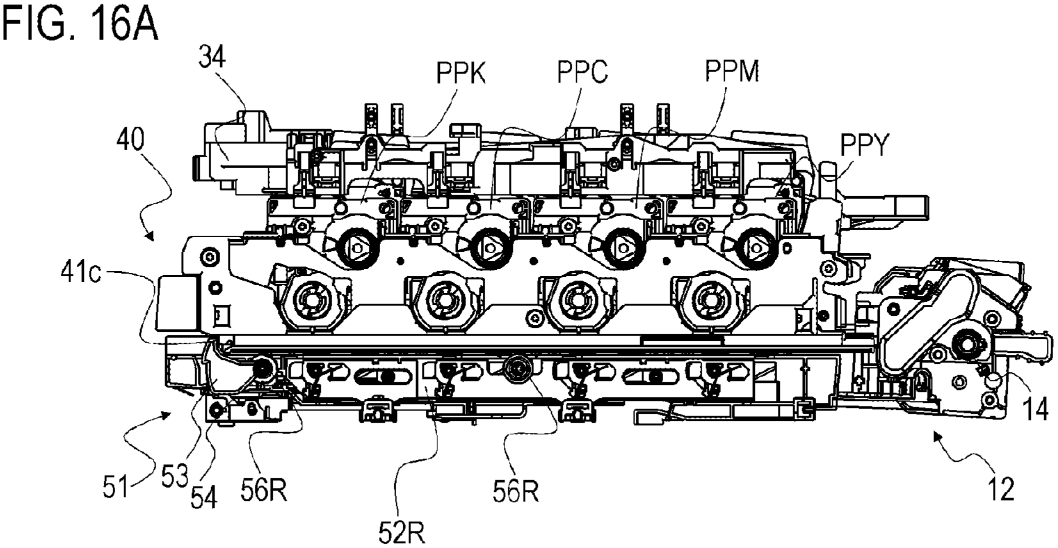
FIG. 16A is a side view of the process cartridges and the cartridge tray in a state in which the front door is closed.
Figure 16B:
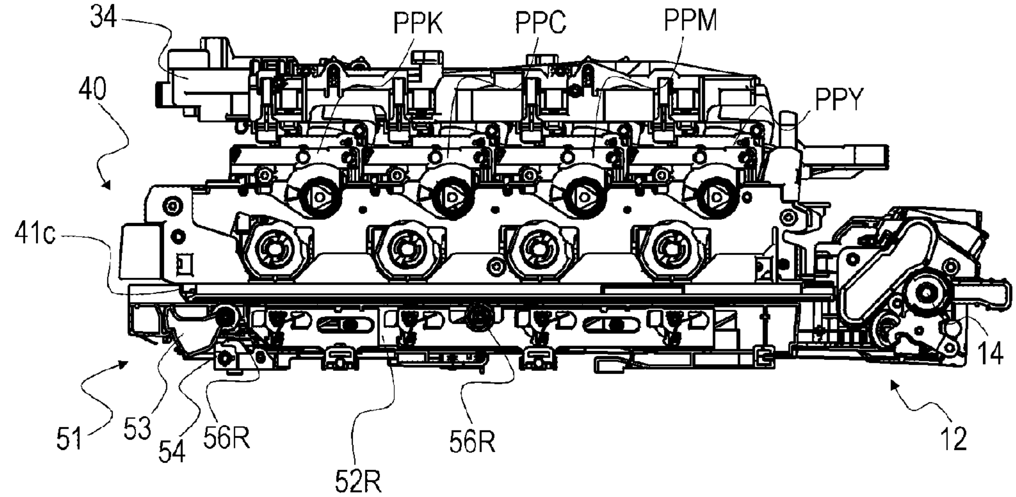
FIG. 16B is a side view of the process cartridges and the cartridge tray in a state in which the front door is open.
Figure 16C:
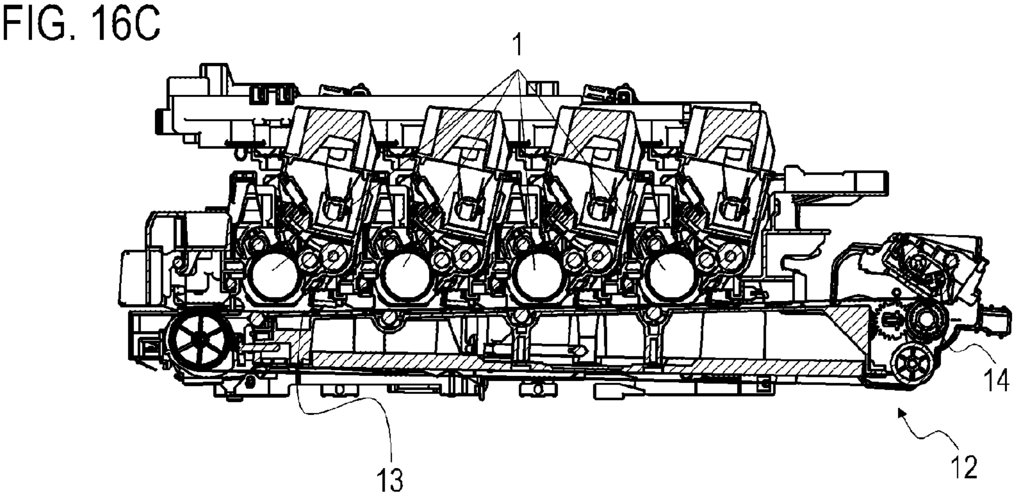
FIG. 16C is a side view of the process cartridges and the cartridge tray in a state in which the front door is open.

The tray pressing lever 53 is pressed by the tray pressing link 54 that is biased by the biasing spring in a state in which the front door 31 is closed as illustrated in FIG. 16A. Thus, the tray pressing lever 53 presses a pressed portion 41*c* formed on the tray side plate 41R of the cartridge tray 40 rearward.

When the front door 31 is opened, the tray pressing lever 53 is retracted downward by the door links 32L and 32R, and by a link member that is omitted from illustration as illustrated in FIG. 16B. Accordingly, pressure of the tray pressing lever 53 toward the rear side of the cartridge tray 40 is released, and the cartridge tray 40 can be removed to the outside of the apparatus main body 100A.

Next, the movements of members in the proximity of the positioning shafts 49 and 50 will be described with reference to FIGS. 11A through 11F. Note, however, that the positioning configurations of the cartridge tray 40 regarding the positioning shafts 49 and 50 are the same on the right and left sides, and accordingly description will be made reading only the right side of the apparatus, and description of the left side of the apparatus will be omitted. When drawing out of the cartridge tray 40 is started, the inclined face 41*f* slides with respect to the positioning shaft 50, and accordingly the deep side of the cartridge tray 40 is raised slightly as illustrated in FIGS. 11A through 11F. The cartridge tray 40 then moves in a drawing out direction Y2 with the sliding face 46*d* provided to the linking member 46 of the cartridge tray 40 sliding with respect to the positioning shaft 50.

Figure 11E:
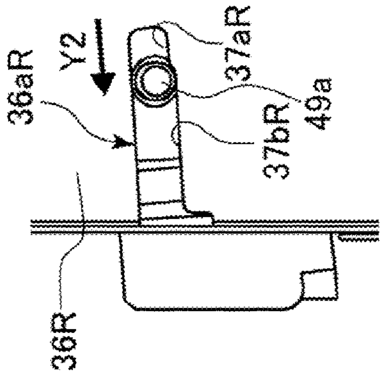
FIG. 11E is a cross-sectional view illustrating the positioning shaft and the positioning groove in a state in which the cartridge tray is slightly drawn out from the mounted state.
Figure 11F:
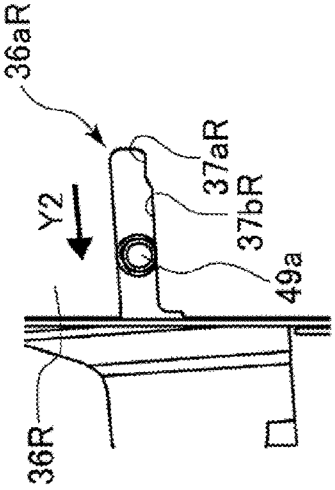
FIG. 11F is a cross-sectional view illustrating the positioning shaft and the positioning groove in a state in which the cartridge tray is further drawn out from the state in FIG. 11E.

At the same time, the end portion 49*a* of the positioning shaft 49 of the cartridge tray 40 exits the fitting groove 37*a*R of the positioning groove 36*a*R, and is handed over to the guide groove 37*b*R. The cartridge tray 40 is drawn out in the drawing out direction Y2, with the end portion 49*a* of the positioning shaft 49 being guided by the guide groove 37*b*R. FIGS. 11A and 11D illustrate a state in which the cartridge tray 40 is situated at the mounted position. FIGS. 11B and 11E illustrate a state in which the cartridge tray 40 is drawn out around 3 mm from the mounted position. FIGS. 11C and 11F illustrate a state in which the cartridge tray 40 is drawn out around 10 mm from the mounted position.

Figure 14A:
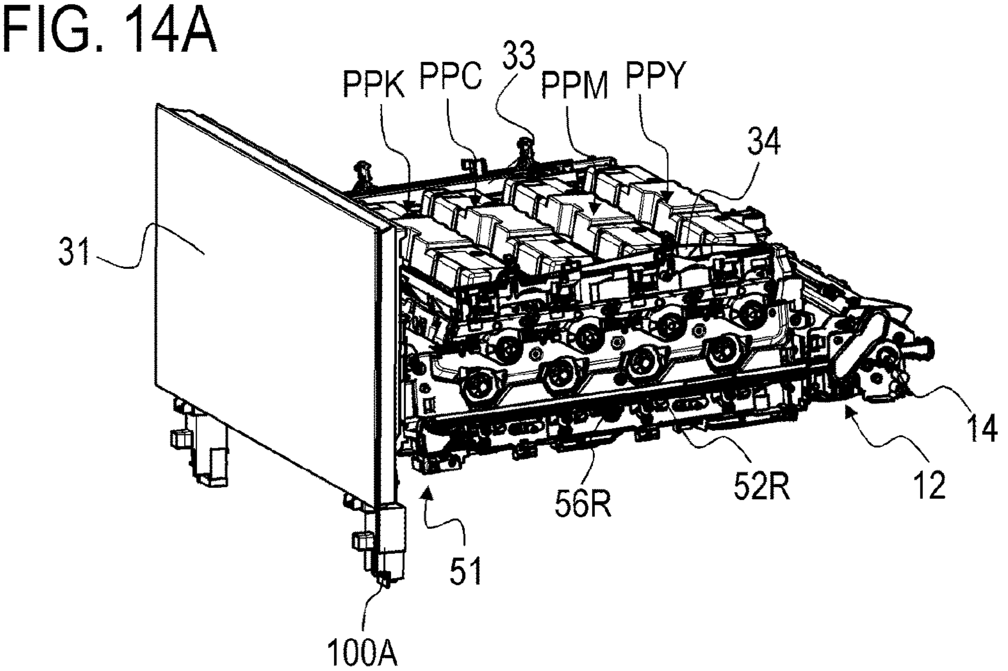
FIG. 14A is a frontal perspective view of the process cartridges and the cartridge tray in a state in which a front door is closed.
Figure 14B:
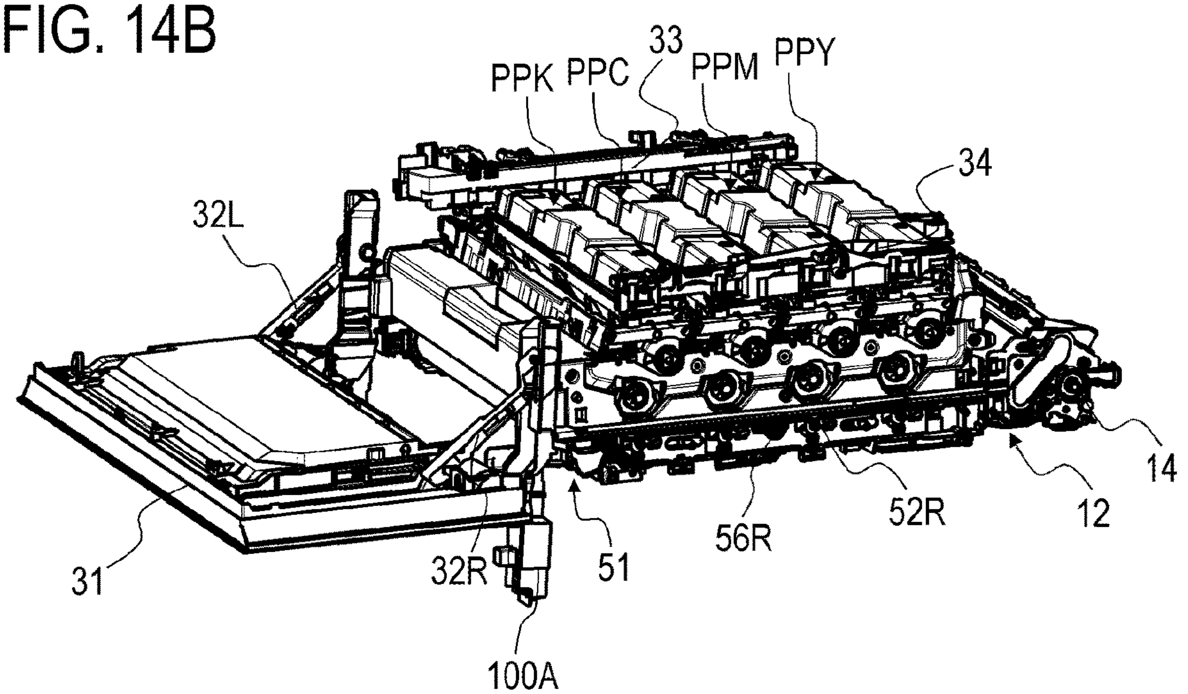
FIG. 14B is a frontal perspective view of the process cartridges and the cartridge tray in a state in which the front door is open.
Figure 15A:
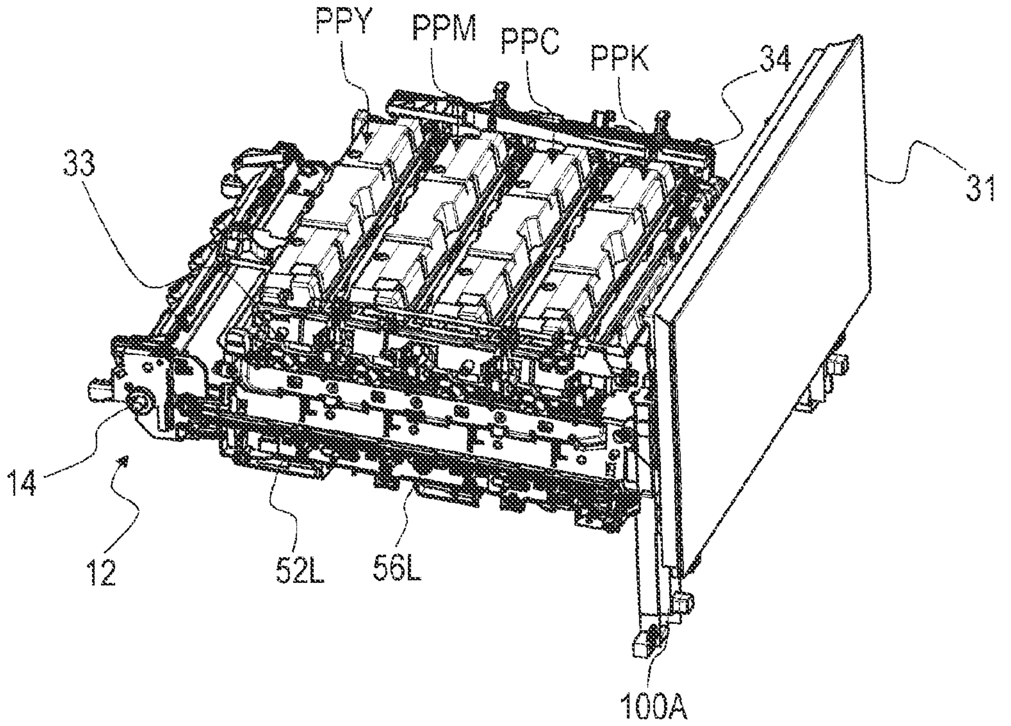
FIG. 15A is a rear perspective view of the process cartridges and the cartridge tray in a state in which the front door is closed.
Figure 15B:
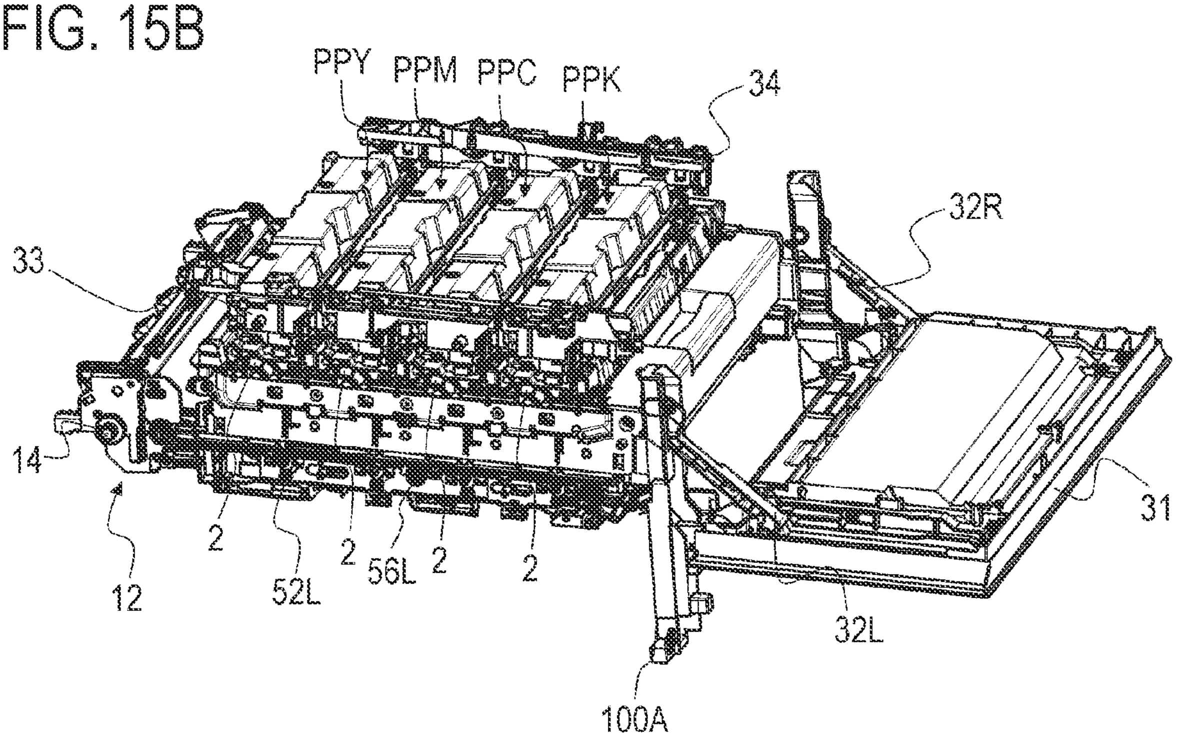
FIG. 15B is a rear perspective view of the process cartridges and the cartridge tray in a state in which the front door is open.

When the cartridge tray 40 is drawn out to a certain degree, the cartridge tray 40 rides on and is guided by rollers 56L and 56R (first rotating member and second rotating member), as illustrated in FIGS. 14B and 15B. The cartridge tray 40 is thus drawn out to the outside of the apparatus main body 100A. Note when forming images, the cartridge tray 40 and the rollers 56L and 56R are not in contact with each other, and a clearance of around 0.5 mm is secured therebetween.

Figure 17A:
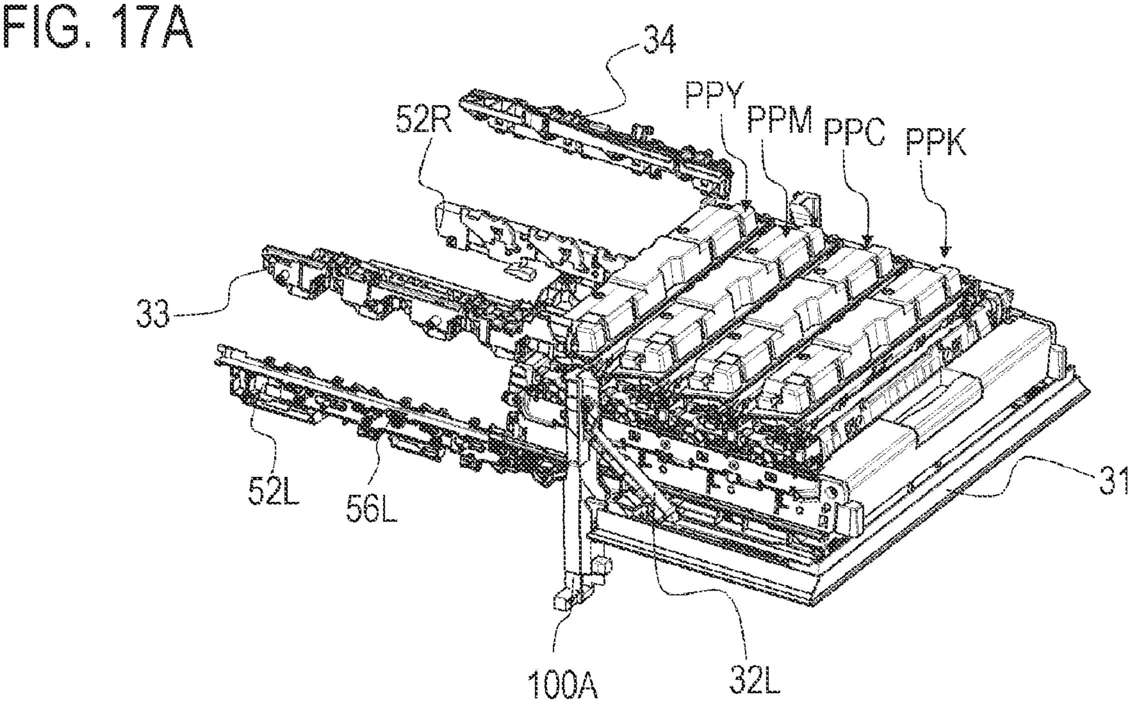
FIGS. 17A and 17B are diagrams illustrating a state in which the cartridge tray is drawn out.
Figure 17B:
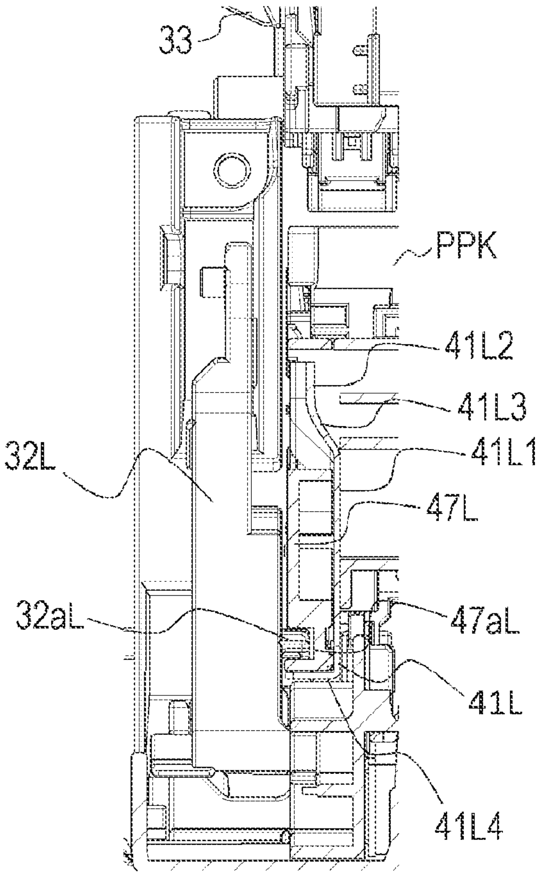

FIGS. 17A and 17B are diagrams illustrating the process of the cartridge tray being drawn out. The guide groove 47*a*L of the cartridge tray 40 is guided by a guide portion 32*a*L provided to the door link 32L. The configurations of the guide groove 47*a*R and a guide portion 32*a*R are the same as the configurations of the guide groove 47*a*L and the guide portion 32*a*L. Accordingly, even in cases in which the amount of drawing out of the cartridge tray 40 is great, the cartridge tray 40 can be smoothly drawn out, with inclination reduced. Also, the attitude of the cartridge tray 40 when being drawn out can be stabilized, thereby facilitating replacement of process cartridges.

The guide grooves 47*a*L and 47*a*R are formed as open-box shapes opening toward the outer side, provided on the outer side of the first supporting portion 41R1 and the second supporting portion 41L1 of the tray side plates 41L and 41R made of a metal material. Protruding portions 41L4 and 41R4 (first protruding portion and second protruding portion) extending toward the outer side from the first supporting portion 41R1 and the second supporting portion 41L1 are disposed below the guide grooves 47*a*L and 47*a*R. The guide grooves 47*a*L and 47*a*R are disposed between the outer side portions 41L2 and 41R2 and the protruding portions 41L4 and 41R4. In the mounting direction of the process cartridges to the cartridge tray 40, the guide groove 47*a*L is disposed on the downstream side of the cartridge engaging portions 41*g*L, 41*h*L, 41*i*L, and 41*j*L, and the guide groove 47*a*R is disposed on the downstream side of the cartridge engaging portions 41*g*R, 41*h*R, 41*i*R, and 41*j*R. Thus, a power guide can be configured. When the cartridge tray 40 is drawn out, the protruding portions 41L4 and 41R4 are supported riding on the rollers 56L and 56R.

Also, the guide grooves 47*a*L and 47*a*R are provided on the inner sides from the first outer side portion 41R2 and the second outer side portion 41L2 in the longitudinal direction of the photosensitive drum 1, and at least part thereof is situated between the first supporting portion 41R1 and the first outer side portion 41R2, and between the second supporting portion 41L1 and the second outer side portion 41L2, respectively, in the longitudinal direction. Accordingly, layout thereof is realized without increasing the size of the cartridge tray 40 and the image forming apparatus. The process cartridges can be mounted to the cartridge tray 40 by dropping the process cartridges in through the opening spreading outward at the top of the cartridge tray 40. The tray side plates 41L and 41R are provided with the first connecting portion 41R3 and the second connecting portion 41L3 that connect between the first supporting portion 41R1 and the second supporting portion 41L1, and the first outer side portion 41R2 and the second outer side portion 41L2. The first connecting portion 41R3 and the second connecting portion 41L3 have inclined faces that incline from the outer side of the mounting portion 40*a* toward the inner side, with respect to the longitudinal direction LD. More specifically, the inclined faces of the first connecting portion 41R3 and the second connecting portion 41L3 incline from the outer side of the mounting portion 40*a* toward the inner side, from the upstream side toward the downstream side in the mounting direction of the process cartridges PP. These inclined faces enable the process cartridges PP to be smoothly mounted to the cartridge tray 40.

The mounted process cartridges PP are positioned by the cartridge engaging portions 41*g*L, 41*h*L, 41*i*L, 41*j*L, 41*g*R, 41*h*R, 41*i*R, and 41*j*R of the tray side plates 41L and 41R. At this time, the grounding members 1*b* that are the cartridge contacts provided at the end portions of the photosensitive drums 1 come into contact with the wire members 48 that are contact members provided to the cartridge tray 40 for each of the process cartridges PP. The wire members 48 serve as intermediate contacts that electrically connect the photosensitive drums 1 and the main body frame 30 of the apparatus main body 100A, as tray contacts. The wire members 48 come into contact with a conducting line 59 below the cartridge engaging portions 41*g*L, 41*h*L, 41*i*L, and 41*j*L, and are connected to the main body side plate 36L of the main body frame 30 via the conducting line 59. That is to say, when the cartridge tray 40 is at the internal position of the apparatus main body 100A, the grounding members 1*b* are electrically connected to the apparatus main body 100A via the wire members 48 and the side plate 41L.

The wire members 48 each have an arm portion 48*b* that serves as a spring portion having spring properties, and a wound portion 48*a* wound following the insertion direction In of the process cartridges PP at a contact portion with the grounding member 1*b*. The wound portion 48*a* is biased toward the side of the grounding member 1*b* by the spring properties of the arm portion 48*b*. The grounding member 1*b* and the wound portion 48*a* come into contact at a position on the upstream side of the cartridge engaging portions 41*g*L, 41*h*L, 41*i*L, and 41*j*L and the downstream side of the second outer side portion 41L2 in the direction of mounting the process cartridges to the cartridge tray 40. Meanwhile, the wound portion 48*a* is roughly positioned by a contact restricting portion 47*e*L provided to the guide member 47L being inserted into and passing through the wound portion 48*a*. Due to this contact restricting portion 47*e*L, the contact position of the grounding member 1*b* and the wound portion

48*a* is restricted to a predetermined position, even when no process cartridge is mounted to the mounting portion 40*a*. Further, by the wire members 48 being disposed lower than the second connecting portion 41L3, damage of the wire members 48 can be suppressed when inserting the process cartridges PP into the cartridge tray 40, and insertion of the process cartridges PP can be smoothly carried out. Also, by disposing the wire members 48 on the inner side from the second outer side portion 41L2 in the longitudinal direction of the photosensitive drums 1, layout thereof is realized without increasing the size of the cartridge tray 40 and the image forming apparatus.

The wire members 48 are disposed adjacent to the outer side of the second supporting portion 41L1 of the tray side plate 41L in the longitudinal direction of the photosensitive drums 1, and further the guide member 47L having the guide groove 47*a*L is provided on the outer side, thereby holding the wire members 48. The wire members 48 are also electrically connected to the tray side plate 41L that is made of a metal material, and as described later, the tray side plate 41L and the positioning shafts 49 and 50 are connected, and the positioning shafts 49 and 50 and the main body frame 30 are connected. Thus, a sturdy grounding contact path is formed.

When the cartridge tray 40 is drawn out and process cartridges are replaced, the cartridge tray 40 is mounted to the apparatus main body 100A. The mounting operation at the time of mounting the cartridge tray 40 to the apparatus main body 100A is reverse to the operations of drawing out. At this time, the sliding face 46*d* first begins sliding with respect to the positioning shaft 50, and after the positioning shaft 50 moves beyond the sliding face 46*d*, the end portion 49*a* of the positioning shaft 49 is handed over from the guide groove 37*b*R to the fitting groove 37*a*R, as illustrated in FIGS. 11B and 11E.

The boundary portion between the guide groove 37*b*R and the fitting groove 37*a*R is an upward incline, and also the end portion 49*a* of the positioning shaft 49 is fit to the fitting groove 37*a*R, and accordingly the operating force exerted by the user at the time of mounting the cartridge tray 40 is great. However, the positioning shaft 49 enters the fitting groove 37*a*R after the sliding face 46*d* has moved beyond the positioning shaft 50, and accordingly, the timing at which a great operating force is exerted by the user is not concentrated, and the operating force can be reduced. Note that in this configuration, when the cartridge tray 40 is inserted as far as a predetermined distance to the mounting position, the cartridge tray 40 is automatically taken up to the mounting position by a later-described take-up device.

When the cartridge tray 40 is inserted to the mounting position, and the front door 31 (opening/closing member) is closed, the tray pressing units 51 press the cartridge tray 40 to the deep side, as illustrated in FIGS. 14A, 15A, and 16A. The drum couplings 1*c* on the driving side of the process cartridges PP and the developing couplings 3*c* (see FIG. 3A) are engaged, and the pressing units 33 and 34 press the process cartridges PP from above.

Figure 18A:
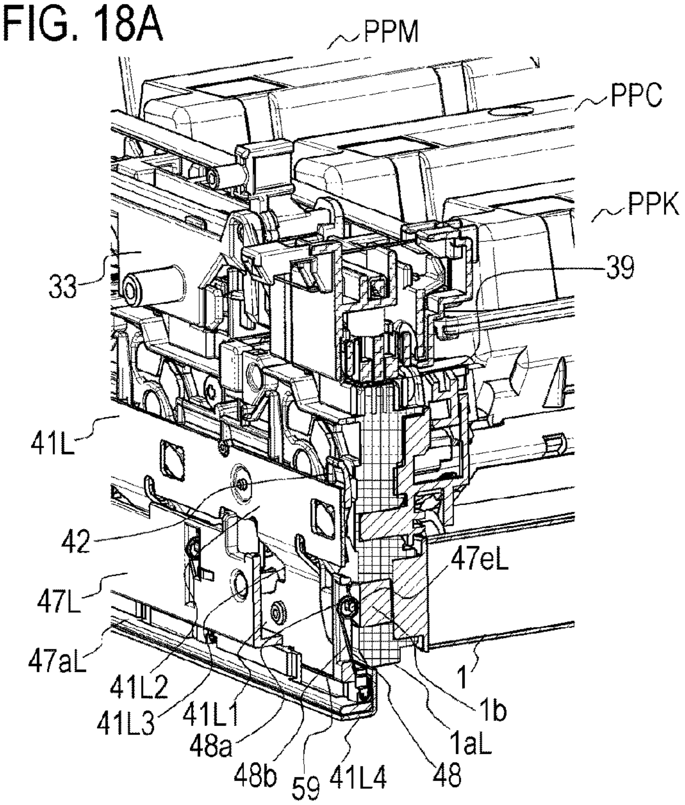
FIGS. 18A through 18C are diagrams illustrating a pressing state at a left side of the process cartridges and a contact state of contacts.
Figure 18B:
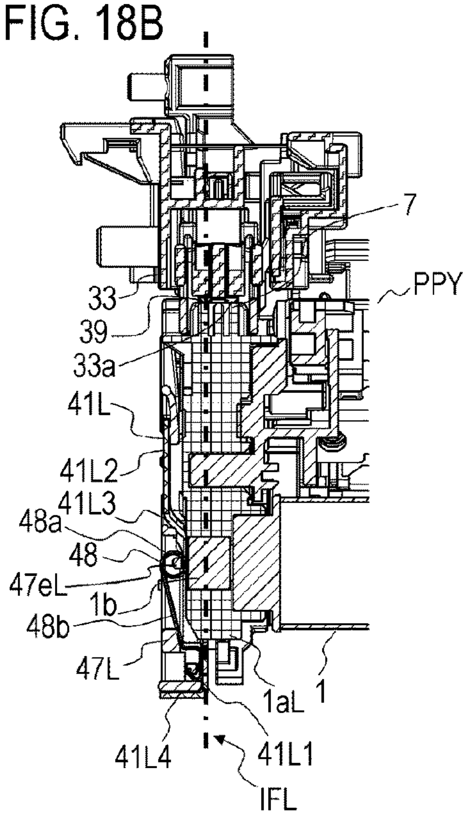
Figure 18C:
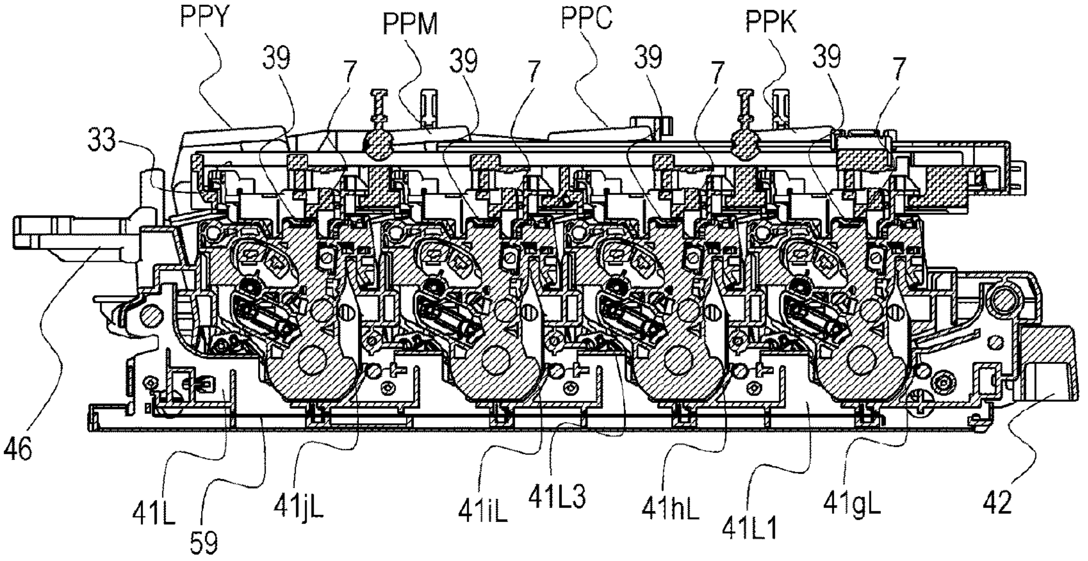
Figure 19A:
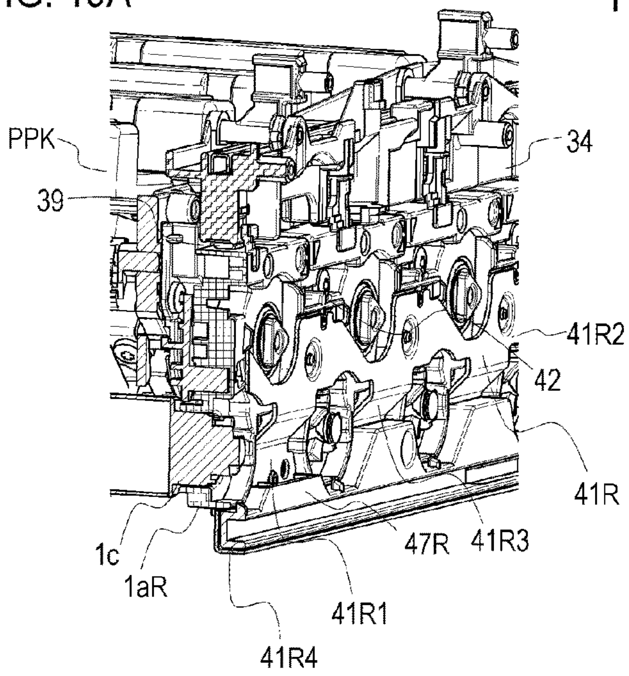
FIGS. 19A through 19C are diagrams illustrating a pressing state at a right side of the process cartridges.
Figure 19B:
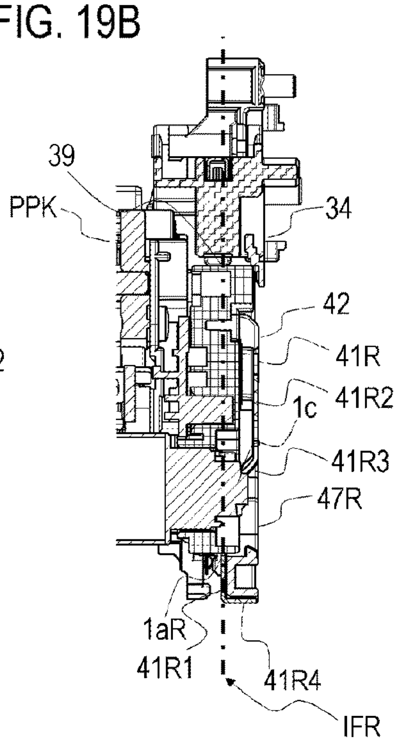
Figure 19C:
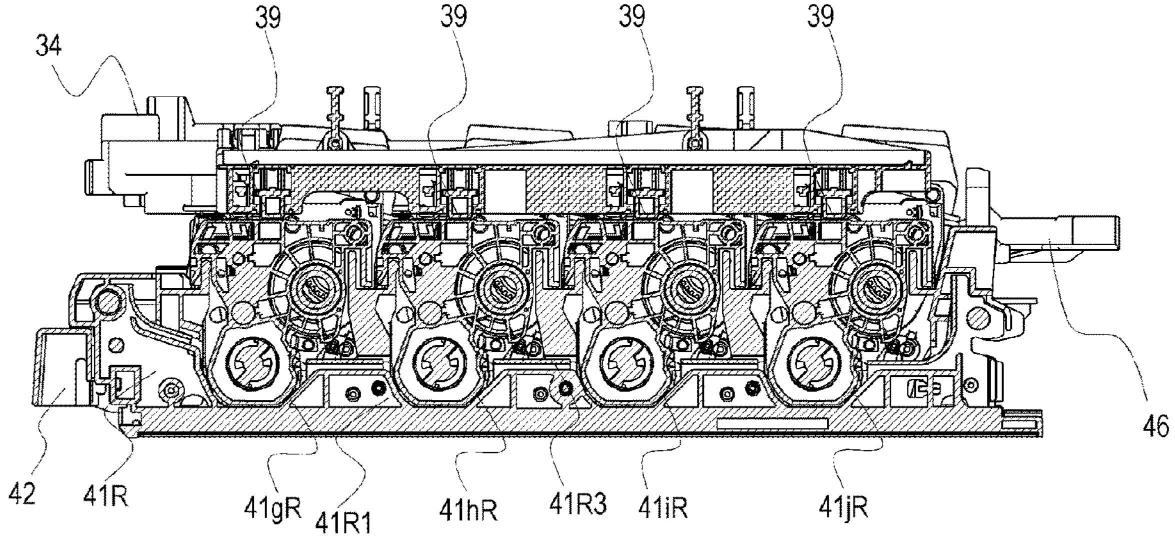

FIGS. 18A through 19C are diagrams illustrating the pressing state of the pressing units 33 and 34 pressing the process cartridges. FIG. 18A is a schematic perspective view partially cut along the longitudinal direction of the photosensitive drums 1 with regard to a contact between the main body developing contact 38 and the cartridge developing contact 2 connected to the developing roller 3, and a contact between a pressing portion 33*a* and a memory member 7, at the left side of the process cartridge PPK. FIG. 18B is a schematic diagram viewing the cut plane of FIG. 18A in the direction of movement of the cartridge tray 40. FIG. 18C is a schematic diagram viewing a cut plane of the process cartridges and the cartridge tray 40 along a second imaginary plane IFL shown in FIG. 18B, in the longitudinal direction of the photosensitive drums 1. FIG. 19A is schematic perspective view partially cut along the longitudinal direction of the photosensitive drums 1 with regard to the center of the drum coupling 1*c* at the right side of the process cartridge PPK. FIG. 19B is a schematic diagram viewing the cut plane of FIG. 19A in the direction of movement of the cartridge tray 40. FIG. 19C is a schematic diagram viewing a cut plane of the process cartridges and the cartridge tray 40 along a first imaginary plane IFR shown in FIG. 19B, in the longitudinal direction of the photosensitive drums 1.

Now, the pressing units 33 and 34 press the drum bearings 1*a*L and 1*a*R toward the cartridge engaging portions 41*g*L, 41*h*L, 41*i*L, 41*j*L, 41*g*R, 41*h*R, 41*i*R, and 41*j*R. The pressing unit 34 (first pressing member) is disposed to intersect the first imaginary plane IFR that is orthogonal to the longitudinal direction of the photosensitive drums 1 and intersects the cartridge engaging portions 41*g*R, 41*h*R, 41*i*R, and 41*j*R (first positioning members). The pressing unit 33 (second pressing member) is disposed to intersect the second imaginary plane IFL that is orthogonal to the longitudinal direction and intersects the cartridge engaging portions 41*g*L, 41*h*L, 41*i*L, and 41*j*L (second positioning members).

Further, as viewed from the longitudinal direction of the photosensitive drums 1, part of contact portions (pressing portions) 39 that are portions where the pressing units 33 and 34 come into contact with the cartridges are disposed overlapping the cartridge engaging portions 41*g*L, 41*h*L, 41*i*L, 41*j*L, 41*g*R, 41*h*R, 41*i*R, and 41*j*R with respect to the pressing direction of the pressing units 33 and 34. That is to say, the force of the pressing units 33 and 34 pressing the process cartridges is received by the cartridge engaging portions 41*g*L, 41*h*L, 41*i*L, 41*j*L, 41*g*R, 41*h*R, 41*i*R, and 41*j*R that are on a straight line therewith. Accordingly, the process cartridges can be strongly held and positioned in a stable manner.

Further, the shaft supporting portions 41*d*L and 41*d*R and the positioning grooves 41*b*L and 41*b*R of the tray side plates 41L and 41R, are provided on the same plane as the cartridge engaging portions 41*g*L, 41*h*L, 41*i*L, 41*j*L, 41*g*R, 41*h*R, 41*i*R, and 41*j*R, and are supported by the positioning shafts 49 and 50 (FIGS. 6A through 7B). Also, the pressing portions 33*a* that are part of the contact portions 39 of the pressing unit 33 are also provided with contacts for the memory members 7 provided to the process cartridges PP, for storing various types of information such as operation history of the relevant process cartridge, performance information unique to the process cartridge, and so forth. By enabling strong holding and positioning of the process cartridges in a stable manner as described above, stable application of electricity and communication can be maintained.

Further, the pressing unit 33 is provided with main body charging contacts 37 for performing electric power supply to the charging rollers 5, as illustrated in FIGS. 20A and 20B. The process cartridges PP have charging contacts 6 electrically connected to the charging rollers 5. The main body charging contacts 37 are configured of wire members having the same configuration as the above-described wire members 48, and are configured to be biased against the charging contacts 6 by the spring properties thereof and come into contact with the charging contacts 6. FIGS. 20A and 20B are diagrams illustrating the positional relation between the power supply contact for electric power supply to the charging roller 5, and the photosensitive drum 1 and the charging roller 5 and so forth. FIG. 20A is a schematic perspective view illustrating the contact of the main body charging contact 37 and the charging contact 6 partially cut along the longitudinal direction of the photosensitive drum 1, at the left side of the process cartridge PPK. FIG. 20B is a schematic diagram viewing the cut plane in FIG. 20A in the direction of movement of the cartridge tray 40. The pressing unit 33 presses the process cartridges PP from above even at the portions where the main body charging contacts 37 are provided. The pressing unit 33 presses the process cartridges PP from above, and also the main body charging contact 37 are positioned as to the charging contacts 6 of the process cartridges, thereby connecting the main body charging contacts 37 and the charging contacts 6. The main body charging contacts 37 are disposed at positions overlapping the photosensitive drums 1 and the charging rollers 5 in the longitudinal direction of the photosensitive drums 1. That is to say, the contact positions of the main body charging contacts 37 and the charging contacts 6 are disposed at positions overlapping the photosensitive drums 1 and the charging rollers 5 in the longitudinal direction of the photosensitive drums 1. Accordingly, the contact portions, the photosensitive drums 1, and the charging rollers 5 can be each accurately positioned as to each other, by the pressing unit 33 pressing in the proximity of the contacts of the main body charging contacts 37 and the charging contacts 6. That is to say, the process cartridges can be strongly held and positioned in a stable manner, whereby stable application of electricity can be maintained. Also, a sturdy and stable contact path can be formed in the proximity of the end portions of the photosensitive drums 1 and the charging rollers 5, and accordingly the contact paths within the process cartridges can be shortened, and the process cartridges can be manufactured inexpensively. Note that the main body charging contacts 37 and the charging contacts 6 are disposed between the first supporting portion 41R1 and the second supporting portion 41L1 in the longitudinal direction of the photosensitive drums 1.

As described above, after a state is entered in which the pressing units 33 and 34 press the process cartridges from above, the main body developing contacts 38 come into contact with the cartridge developing contacts 2 (see FIG. 3B) connected to the developing rollers 3, and the transfer units 12 rotate upwards, centered on the driving rollers 14. Thus, the photosensitive drum 1 of each process cartridge comes into contact with the intermediate transfer belt 13.

As described above, in a state in which the front door 31 is closed and the printer 100 is capable of forming images, the positioning shaft 50 and the positioning grooves 41*b*L and 41*b*R are engaged at the front side of the cartridge tray 40. The inclined faces 41*f* are provided to the positioning grooves 41*b*L and 41*b*R, and accordingly at this time, the cartridge tray 40 is drawn inward in the insertion direction Y1 on the basis of the own weight of the cartridge tray 40 and the downward force from the pressing units 33 and 34. Accordingly, the positioning faces 41*e* are pressed against the positioning shaft 50, and the cartridge tray 40 can be precisely positioned in the insertion direction Y1.

Also, at the rear side of the cartridge tray 40, the positioning shaft 49 and the positioning grooves 36*a*L and 36*a*R are engaged. At this time, the end portions 49*a* of the positioning shaft 49 fit into the fitting groves of the positioning grooves 36*a*L and 36*a*R, and accordingly the cartridge tray 40 can be suppressed from rotating in a direction orthogonal to the mounting direction Y1, i.e., centered on the positioning shaft 50.

The above positioning shaft 50 and the positioning grooves 36*a*L and 36*a*R provided to the apparatus main body 100A, and the positioning grooves 41*b*L and 41*b*R and the positioning shaft 49 provided to the cartridge tray 40, make up a positioning mechanism 60 (see FIGS. 11A and 11D). The positioning mechanism 60 positions the cartridge tray 40 as to the apparatus main body 100A.

Further, the positioning shaft 50 is supported from below by the rib 46*b* provided to the linking member 46 of the cartridge tray 40, whereby downward deflection of the positioning shaft 50 is restricted. Also, deformation of the cartridge tray 40 itself is suppressed by the retaining portions 46*c* provided to the linking member 46. The positioning shaft 49 at the back side of the cartridge tray 40 is also supported from below by the shaft contact portion 42*c*, thereby restricting downward deflection of the positioning shaft 49. According to such a configuration, the positioning shafts 49 and 50 may be formed with a smaller shaft diameter, or made from an inexpensive resin material, and accordingly costs and size can be reduced.

According to these, the cartridge tray 40 can be precisely positioned as to the apparatus main body 100A at the mounting position. In particular, the process cartridges held in the cartridge tray 40 are pressed from the upper side by the pressing units 33 and 34 at the time of forming images, but the precision of positioning of the cartridge tray 40 is not affected. Accordingly, the precision of positions of the process cartridges held in the cartridge tray 40, specifically the positional precision between the photosensitive drums 1 and the intermediate transfer belt 13 is improved, and high-quality images can be formed.

Also, due to the operations of the inclined faces 41*f* at the front side of the cartridge tray 40, and the pressing of the tray pressing units 51 at the back side, the cartridge tray 40 is biased toward the front side in the mounting position. Accordingly, positional deviation of the cartridge tray 40 due to vibrations and so forth at the time of forming images can be reduced. Also, by generating force of pressing in at the front and rear of the cartridge tray 40, the force of pressing inward is dispersed, and the elastic force of the biasing spring of the tray pressing units 51 can be kept small. Accordingly, the size and cost of the tray pressing units 51 can be reduced.

According to the present invention, cartridges can be positioned to side plates of the tray unit in a stable manner by the above configuration.

Also, according to the present invention, tray contacts of the tray unit to be electrically connected to cartridge contacts of cartridges can be laid out while conserving space.

Further, according to the present invention, guide grooves of the tray unit guided by the apparatus main body can be laid out while conserving space.

Note that which of the apparatus main body 100A and the cartridge tray 40 that the positioning shaft 50 and the positioning grooves 41*b*L and 41*b*R included in the positioning mechanism 60 belong to may be switched, as long as one is disposed in one and the other is disposed in the other. Also, which of the apparatus main body 100A and the cartridge tray 40 that the positioning shaft 49 and the positioning grooves 36*a*L and 36*a*R included in the positioning mechanism 60 belong to may be switched, as long as one is disposed in one and the other is disposed in the other.

Also, the positioning shaft 49 is not limited to being a through shaft over the entire length of the cartridge tray 40 in the right-left direction. It is sufficient for two protrusions to be formed protruding outward to both sides of the cartridge tray 40.

Although the drum units OP and the developing units DP are integrally formed in the process cartridges, these may be configured separately. The cartridge tray 40 may hold only the drum units OP, or hold only the developing units DP, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-136229, filed on Aug. 12, 2020, No.2020-136143, filed on Aug. 12, 2020, No. 2020-136209, filed on Aug. 12, 2020, which are hereby incorporated by reference herein in its entirety.

What is claimed is:

1. An image forming apparatus comprising:

a cartridge including a photosensitive drum and a grounding member for connecting the photosensitive drum to ground potential;

an apparatus main body; and a tray unit to which the cartridge is detachably mounted, and that is configured to be capable of moving with respect to the apparatus main body, between an internal position situated within the apparatus main body and an external position situated outside of the apparatus main body, the tray unit including:

a first side plate configured to support the cartridge, wherein the first side plate is made of metal, and includes a first inner portion and a first outer side portion, the first inner portion includes a first positioning portion, and the first positioning portion is configured to come into contact with the cartridge to position the cartridge as to an image forming position at which an image forming operation is performed, a second side plate configured to support the cartridge, wherein the second side plate is made of metal, and includes a second inner portion and a second outer side portion, the second inner portion is provided with an exposing opening and includes a second positioning portion, and the second positioning portion is configured to come into contact with the cartridge to position the cartridge as to the image forming position, and a mounting portion to which the cartridge is mounted, wherein the mounting portion is formed between the first side plate and the second side plate, and, the first inner portion and the second inner portion are situated between the first outer side portion and the second outer side portion in a longitudinal direction of the cartridge mounted to the mounting portion, wherein the grounding member is exposed from the mounting portion through the exposing opening so that the grounding member is electrically connected to the apparatus main body in a state where the tray unit is situated at the internal position.

2. The image forming apparatus according to claim 1, wherein, in a case where the tray unit is situated at the internal position, the grounding member is electrically connected to the apparatus main body via a grounding contact.

3. The image forming apparatus according to claim 2, wherein the grounding contact has (i) a contact portion configured to contact the grounding member and (ii) a spring portion that biases the contact portion toward the first side plate in the longitudinal direction.

4. The image forming apparatus according to claim 3, wherein the contact portion is disposed in a wound portion.

5. The image forming apparatus according to claim 1, wherein the first side plate has a first opening that exposes the cartridge to an outside of the mounting portion, and wherein the cartridge includes a driving transmission member that transmits a driving force from the apparatus main body, the first opening exposes the driving transmission member to an outside of the tray unit.

6. The image forming apparatus according to claim 1, wherein the first side plate integrally includes the first inner portion, the first outer side portion, and a first connecting portion that connects the first inner portion and the first outer side portion, wherein the second side plate integrally includes the second inner portion, the second outer side portion, and a second connecting portion that connects the second inner portion and the second outer side portion.

7. The image forming apparatus according to claim 1, wherein the cartridge includes a memory for storing information, and the apparatus main body includes an urging unit including a memory contact configured to connect with the memory.

8. The image forming apparatus according to claim 7, wherein the memory is between the first outer side portion and the second outer side portion in the longitudinal direction of the cartridge mounted to the mounting portion.

9. The image forming apparatus according to claim 7, wherein the urging unit is located above the cartridge mounted to the mounting portion.

10. An image forming apparatus comprising:

a cartridge including a photosensitive drum and a grounding member for connecting the photosensitive drum to ground potential;

an apparatus main body; and a tray unit to which the cartridge is detachably mounted, and that is configured to be capable of moving with respect to the apparatus main body, between an internal position situated within the apparatus main body and an external position situated outside of the apparatus main body, the tray unit including:

a first side plate configured to support the cartridge, wherein the first side plate is made of metal, and includes a first inner portion and a first outer side portion, the first inner portion includes a first positioning portion, and the first positioning portion is configured to come into contact with the cartridge to position the cartridge as to an image forming position at which an image forming operation is performed, a second side plate configured to support the cartridge, wherein the second side plate is made of metal, and includes a second inner portion and a second outer side portion, the second inner portion is provided with an exposing opening and includes a second positioning portion, and the second positioning portion is configured to come into contact with the cartridge to position the cartridge as to the image forming position, and a mounting portion to which the cartridge is mounted, wherein the mounting portion is formed between the first side plate and the second side plate, and, the first inner portion and the second inner portion are situated between the first outer side portion and the second outer side portion in a rotation axis direction of the photosensitive drum of the cartridge mounted to the mounting portion, wherein the grounding member is exposed from the mounting portion through the exposing opening so that the grounding member is electrically connected to the apparatus main body in a state where the tray unit is situated at the internal position.

11. The image forming apparatus according to claim 10, wherein, in a case where the tray unit is situated at the internal position, the grounding member is electrically connected to the apparatus main body via a grounding contact.

12. The image forming apparatus according to claim 11, wherein the grounding contact has (i) a contact portion configured to contact the grounding member and (ii) a spring portion that biases the contact portion toward the first side plate in the rotation axis direction.

13. The image forming apparatus according to claim 12, wherein the contact portion is disposed in a wound portion.

14. The image forming apparatus according to claim 10, wherein the first side plate has a first opening that exposes the cartridge to an outside of the mounting portion, and wherein the cartridge includes a driving transmission member that transmits a driving force from the apparatus main body, the first opening exposing the driving transmission member to an outside of the tray unit.

15. The image forming apparatus according to claim 10, wherein the first side plate integrally includes the first inner portion, the first outer side portion, and a first connecting portion that connects the first inner portion and the first outer side portion, wherein the second side plate integrally includes the second inner portion, the second outer side portion, and a second connecting portion that connects the second inner portion and the second outer side portion.

16. The image forming apparatus according to claim 10, wherein the cartridge includes a memory for storing information, and the apparatus main body includes an urging unit including a memory contact configured to connect with the memory.

17. The image forming apparatus according to claim 16, wherein the memory is between the first outer side portion and the second outer side portion in the rotation axis direction of the photosensitive drum of the cartridge mounted to the mounting portion.

18. The image forming apparatus according to claim 16, wherein the urging unit is located above the cartridge mounted to the mounting portion.

* * * * *